(12) United States Patent
Low

(10) Patent No.: US 12,286,580 B2
(45) Date of Patent: Apr. 29, 2025

(54) COMPOSITIONS

(71) Applicant: Mexichem Fluor S.A. de C.V., San Luis Potosi (MX)

(72) Inventor: Robert Low, Runcorn (GB)

(73) Assignee: Mexichem Fluor S.A. de C.V., San Luis Potosi (MX)

( * ) Notice: Subject to any disclaimer, the term of this patent is extended or adjusted under 35 U.S.C. 154(b) by 0 days.

(21) Appl. No.: 17/428,930

(22) PCT Filed: Feb. 11, 2020

(86) PCT No.: PCT/GB2020/050308
§ 371 (c)(1),
(2) Date: Aug. 5, 2021

(87) PCT Pub. No.: WO2020/165571
PCT Pub. Date: Aug. 20, 2020

(65) Prior Publication Data
US 2025/0043166 A1     Feb. 6, 2025

(30) Foreign Application Priority Data

Feb. 11, 2019  (GB) ........................... 1901885
Feb. 11, 2019  (GB) ........................... 1901890
Aug. 14, 2019  (WO) ............... PCT/GB2019/052290

(51) Int. Cl.
*C09K 5/04*     (2006.01)

(52) U.S. Cl.
CPC ........ *C09K 5/045* (2013.01); *C09K 2205/122* (2013.01); *C09K 2205/126* (2013.01); *C09K 2205/22* (2013.01); *C09K 2205/40* (2013.01)

(58) Field of Classification Search
CPC .............. C09K 5/045; C09K 2205/122; C09K 2205/126; C09K 2205/22; C09K 2205/40
See application file for complete search history.

(56) References Cited

U.S. PATENT DOCUMENTS

| 2015/0376486 A1 | 12/2015 | Hashimoto et al. |
| 2015/0377533 A1* | 12/2015 | Harkins ................. C09K 5/045 62/529 |
| 2016/0002518 A1 | 1/2016 | Taniguchi et al. |
| 2016/0178246 A1 | 6/2016 | Toyooka et al. |

(Continued)

FOREIGN PATENT DOCUMENTS

| EP | 3 109 292 A1 | 12/2016 |
| EP | 3 825 281 A1 | 5/2021 |

(Continued)

OTHER PUBLICATIONS

Canadian Office Action, Jan. 5, 2024, pp. 1-5, issued in Canadian Patent Application No. 3,129,574, Canadian Intellectual Property Office, Gatineau, Quebec.

(Continued)

*Primary Examiner* — Emmanuel E Duke
(74) *Attorney, Agent, or Firm* — Crowell & Moring LLP

(57) ABSTRACT

The invention provides a composition comprising (a) from about 6 to about 18 weight % R-1132a, (b) from about 5 to about 35 weight % R-32, and (c) from about 47 to about 89 weight % R-1234yf. The use of such a composition as a working fluid in a heat pump system of a vehicle, preferably an electric vehicle, is also provided.

33 Claims, 1 Drawing Sheet

(56) References Cited

U.S. PATENT DOCUMENTS

| | | | |
|---|---|---|---|
| 2016/0340565 A1 | 11/2016 | Tasaka et al. | |
| 2017/0335159 A1 | 11/2017 | Fukushima et al. | |
| 2018/0051198 A1 | 2/2018 | Okamoto et al. | |
| 2018/0355269 A1* | 12/2018 | Low | C09K 21/02 |

FOREIGN PATENT DOCUMENTS

| | | |
|---|---|---|
| EP | 3 825 381 A1 | 5/2021 |
| GB | 1813237.3 | 2/2020 |
| WO | WO 2010/119265 A1 | 10/2010 |
| WO | WO 2015/006258 A1 | 1/2015 |
| WO | WO 2016/182030 A1 | 11/2016 |
| WO | WO 2016/190177 A1 | 12/2016 |
| WO | WO 2017/098238 A1 | 6/2017 |
| WO | WO 2018/232394 A1 | 12/2018 |
| WO | WO 2019030508 A1 | 2/2019 |
| WO | WO 2020/017522 A1 | 1/2020 |
| WO | WO 2020/035690 A1 | 2/2020 |

OTHER PUBLICATIONS

Korean Office Action with English translation, May 16, 2024, pp. 1-16, issued in Korean Patent Application No. 10-2021-7021523, Korean Intellectual Property Office.
International Search Report for corresponding International Application No. PCT/GB2020/050308, dated May 6, 2020.
Written Opinion of the International Searching Authority for corresponding International Application No. PCT/GB2020/050308, dated May 6, 2020.
European Examination Report for corresponding European patent application No. 20705251.5, dated Nov. 25, 2022, 5 pgs.
Examination Report for corresponding Indian patent application No. 202127040584, dated Jan. 16, 2023, 5 pgs.
International Search Report of PCT Application PCT/GB2019/052290 dated Nov. 6, 2019, 4 pages.
Search Report Under Section of Great Britain application 1901885.2 dated Jul. 31, 2019, 1 page.
Examination Report under Section 18(3) of Great Britain application 1901885.2 dated Jan. 22, 2020, 2 pages.

* cited by examiner

COMPOSITIONS

CROSS-REFERENCE TO RELATED APPLICATIONS

This application is the U.S. National Stage application of PCT application no. PCT/GB2020/050308, filed on Feb. 11, 2020, titled COMPOSITIONS, designating the United States, which claims priority to PCT application no. PCT/GB2019/052290 filed Aug. 14, 2019, and which claims priority to Great Britain application no. 1901885.2, filed on Feb. 11, 2019, and which claims priority to Great Britain application no. 1901890.2, filed on Feb. 11, 2019, the contents of which are each incorporated herein by reference in their entirety.

The present invention relates to a refrigerant composition and more particularly to a refrigerant composition comprising 1,1-difluoroethylene (R-1132a), difluoromethane (R-32) and 2,3,3,3-tetrafluoropropene (R-1234yf) that is useful in mobile or automotive thermal management systems, such as heat pump and air-conditioning systems, especially systems for electric vehicles.

The listing or discussion of a prior-published document or any background in the specification should not necessarily be taken as an acknowledgement that a document or background is part of the state of the art or is common general knowledge.

Unless otherwise stated, it is to be understood that the term "electric vehicle" as used herein refers to both purely electric vehicles as well as vehicles which use electricity as one of several means of propulsion, such as hybrid vehicles.

Cars fitted with internal combustion engines (ICEs) as primary propulsion systems often also have air-conditioning systems to provide passenger comfort by cooling and dehumidifying air. Such cars provide passenger heating in low-temperature environments by using waste heat from the engine to heat cabin air.

In contrast, electric vehicles (EVs) have no high-temperature source of heat in sufficient quantity to provide similar cabin heating. Instead, passenger heating must be achieved either by using battery energy in a resistive heating system or by recycling and upgrading heat from other sources using a heat pump. As EV passengers also require cooling in warm temperatures, a common strategy is to use the air conditioning system in reverse as a heat pump to provide some or all of the required heat at the appropriate temperature to the cabin air. Although the use of a heat pump architecture is more expensive, it can help reduce the overall power draw for passenger heating.

Despite this, it is known that passenger thermal comfort requirements can significantly reduce the effective driving range of EVs both in winter (from providing heating) and in summer (from providing air conditioning). Thus, improving energy efficiency of heating and air-conditioning of the vehicle would help reduce so-called "range anxiety" amongst EV users.

The existing refrigerants used for mobile air conditioning are: 1,1,1,2-tetrafluoroethane (R-134a), 2,3,3,3-tetrafluoropropene (R-1234yf) and carbon dioxide ($CO_2$, R-744). R-134a has a Global Warming Potential (GWP) of 1430 and is gradually being phased out in favour of R-1234yf (GWP of about 1) in order to meet new EU F-Gas regulations, which mandate that new mobile air-conditioning (MAC) systems should use a refrigerant with GWP less than 150. Although both R-134a and R-1234yf offer good and energy efficient performance in air conditioning systems (whether for ICE or EV vehicles), they are limited in their ability to work in a "heat pump mode" for EVs.

Ambient air temperature can be as low as −25° C. to −30° C. The use of R-134a and/or R-1234yf can be advantageous if the ambient temperature is above about −10° C.; however, below this temperature their relatively low vapour pressure reduces the capacity of the system and also reduces the energy efficiency of the heat pump.

Carbon dioxide is only used in a few ICE vehicles at present because it requires high-pressure equipment (leading to higher cost than that for system components using R-1234yf) and it offers poor energy efficiency in air-conditioning operation at higher ambient temperatures.

The use of highly flammable refrigerants such as 1,1-difluoroethane (R-152a) or propane, coupled with a "secondary loop" architecture to provide passenger safety has also been advocated. Whilst this technology is conceptually suited to some EV thermal management systems where a chiller moves heat between reservoirs of hot and cold liquid (said liquids then being used to perform cabin air heating or air conditioning), it is not likely to be universally adopted in EVs or ICE vehicles.

Car manufacturers anticipate rapid growth in electric vehicles but a continued presence of significant numbers of ICE vehicles for the next 10 to 15 years. Thus, the use of a single refrigerant composition across all platforms would offer production benefits and simpler manufacturing and maintenance operations.

Therefore, there is a need to provide a refrigerant composition that offers the following characteristics:
(a) acceptable performance (ideally better than that of R-1234yf) in both air-conditioning and heat pump modes;
(b) flammability characteristics similar to those of R-1234yf;
(c) a GWP of below about 150

At the same time, such compositions preferably should achieve satisfactory performance when operating in a heat pump mode at ambient temperatures as low as from about −25° C. to about −30° C.

BRIEF DESCRIPTION OF THE DRAWINGS

The invention will be described, by way of example, with reference to the accompanying figures, in which.

DETAILED DESCRIPTION

Figure 1:
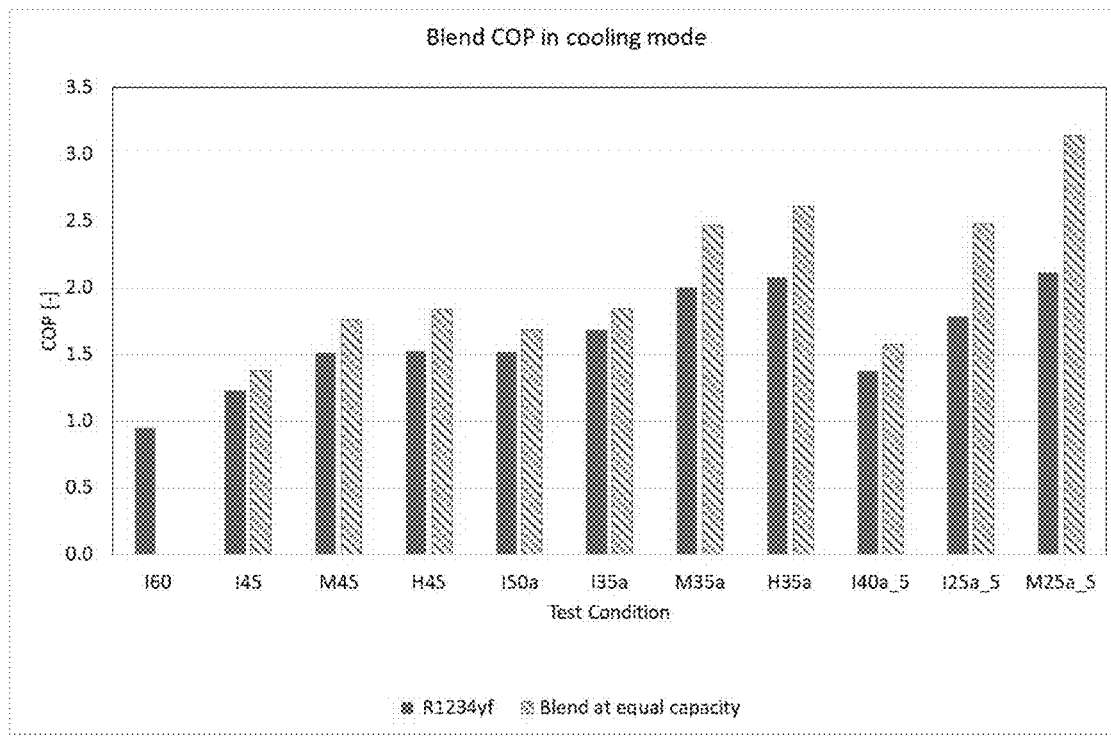
FIG. 1 shows the coefficient of performance (COP) in cooling mode for an exemplary blend and R-1234yf; and, FIG. 2 shows the heating capacity for an exemplary blend and R-1234yf.

The present invention addresses the above and other deficiencies, and the above needs, by the provision of a composition comprising 1,1-difluoroethylene (R-1132a), difluoromethane (R-32) and 2,3,3,3-tetrafluoropropene (R-1234yf) in particular amounts. Such compositions are referred to hereinafter as "the compositions of the (present) invention".

The present inventors have found that the compositions disclosed herein offer improved performance relative to R-1234yf both in air-conditioning and heat pump modes of operation. This renders these fluids suitable for use in the air-conditioning systems of conventional ICE platforms and also in the thermal management systems of EV platforms.

This finding is unexpected at least because the critical temperatures of these compositions are lower than those of R-1234yf. It is known that the efficiency of a vapour compression air-conditioning cycle reduces as the condensation temperature approaches the critical temperature. One might therefore anticipate that the performance of these compositions would be worse when compared to R-1234yf, especially at higher condensing temperatures which are required when operating the car in hot climates. However, it has been found that the compositions of the invention offer improved efficiencies in equipment as compared to R-1234yf. Consequently, the obtained performance is higher in both cooling capacity and energy efficiency (described as "Coefficient of Performance", which is the ratio of useful cooling power to work input to the system).

Furthermore, the compositions of the invention have higher vapour pressures than that of R-1234yf and hence allow operation at lower external ambient temperatures in a heat pump mode. Thus, the compositions offer improved energy consumption and heating capacity in heating mode as well as cooling mode.

A further benefit of the compositions is that they are zeotropic and exhibit moderate "temperature glides".

The compositions of the invention will now be described in detail.

The compositions of the present invention typically comprise from about 6 to about 18 weight % R-1132a, from about 5 to about 35 weight % R-32 and from about 47 to about 89 weight % R-1234yf.

Conveniently, such compositions comprise from about 6 to about 15 weight % R-1132a, such as from about 7 to about 12 weight %, for example from about 7 to about 10 weight %.

Typically, the compositions of the present invention comprise from about 6 to about 30 weight % R-32, such as from about 7 to about 20 weight %, for example from about 8 to about 15 weight %, preferably from about 9 to about 13 weight %.

Advantageously, such compositions comprise from about 55 to about 88 weight % R-1234yf, such as from about 60 to about 87 weight %, for example from about 75 to about 85 weight %, preferably from about 78 to about 84 weight %.

The compositions of the present invention conveniently comprise from about 6 to about 10 weight % R-1132a, such as from 6 to about 7 weight %.

Preferably, such compositions comprise from about 6 to less than about 30 weight % R-32, such as from about 7 to less than about 30 weight %.

Typically, the compositions of the invention comprise from about 55 to about 87 weight % R-1234yf, such as from about 60 to about 84 weight %, preferably from about 75 to about 84 weight %.

For example, one of the preferred compositions of the present invention comprises about 8 weight % R-1132a, about 11 weight % R-32 and about 81 weight % R-1234yf.

Alternatively, the compositions of the invention may comprise from about 6 to about 9 weight % R-1132a, such as from about 6 to about 8 weight %.

Advantageously, the compositions of the invention may contain from about 7 to about 28 weight % R-32, such as from about 10 to about 25 weight %, for example from about 12 to about 23 weight %, preferably from about 14 to about 21 weight %, even more preferably from about 15 to about 19 weight %.

Typically, the compositions of the present invention may comprise from about 63 to about 85 weight % R-1234yf, for example from about 67 to about 83 weight %, preferably from about 69 to about 82 weight %, even more preferably from about 72 to about 81 weight %.

For example, one of the preferred compositions of the present invention may comprise about 6 weight % R-1132a, about 20 weight % R-32 and about 74 weight % R-1234yfn.

Preferably, the tolerances (preferably manufacturing tolerances) for the compositions of the present invention are about ±0.5 weight % for R-1132a, about ±1 weight % for R-32 and about ±1.5 weight % for R-1234yf.

In one embodiment, the compositions of the present invention consist essentially of the stated components. By the term "consist essentially of", we include the meaning that the compositions of the invention contain substantially no other components, particularly no further (hydro)(fluoro) compounds (e.g. (hydro)(fluoro)alkanes or (hydro)(fluoro) alkenes)) known to be used in heat transfer compositions. The term "consist of" is included within the meaning of "consist essentially of".

In one embodiment, the compositions of the invention are substantially free of any component that has heat transfer properties (other than the components specified). For instance, the compositions of the invention may be substantially free of any other hydrofluorocarbon compound.

By "substantially no" and "substantially free of" we include the meaning that the compositions of the invention contain 0.5% by weight or less of the stated component, preferably 0.4%, 0.3%, 0.2%, 0.1% or less, based on the total weight of the compositions.

As used herein, all % amounts mentioned in the compositions herein, including in the claims, are by weight based on the total weight of the composition, unless otherwise stated.

By the term "about", as used in connection with numerical values of amounts of component in % by weight, we include the meaning of ±0.5 weight %, for example ±0.2 weight %.

For the avoidance of doubt, it is to be understood that the stated upper and lower values for ranges of amount of components in the compositions of the invention described herein may be interchanged in any way, provided that the resulting ranges fall within the broadest scope of the invention.

The compositions of the present invention have zero ozone depletion potential.

Conveniently, the compositions of the invention have a Global Warming Potential (GWP) of less than about 400, such as less than about 150, preferably less than about 140 or less than about 125.

Typically, the compositions of the invention are of reduced flammability hazard when compared to R-1132a.

Flammability may be determined in accordance with ASHRAE Standard 34 (e.g. ASHRAE Standard 34:2019) incorporating the ASTM Standard E-681, the entire content of which is incorporated herein by reference.

In one aspect, the compositions have one or more of (a) a higher lower flammable limit; (b) a higher ignition energy (c) a higher auto-ignition temperature; or (d) a lower burning velocity compared to R-1132a alone.

Preferably, the compositions of the invention are less flammable compared to R-1132a in one or more of the following respects: lower flammable limit at 23° C.; lower flammable limit at 60° C.; breadth of flammable range at 23° C. or 60° C.; auto-ignition temperature (thermal decomposition temperature); minimum ignition energy in dry air or burning velocity. The flammable limits and burning velocity being determined according to the methods specified in ASHRAE-34 and the auto-ignition temperature being determined in a 500 ml glass flask by the method of ASTM E659-78.

Conveniently, the compositions of the present invention have a burning velocity of less than about 10 cm/s as determined in accordance with ASHRAE Standard 34:2019, such as less than about 9 cm/s, for example less than about 8 cm/s.

In one embodiment, the compositions of the invention are classified as weakly flammable ("class 2L") as determined in accordance with ASHRAE Standard 34:2019.

It is believed that the compositions of the invention exhibit a completely unexpected combination of low/non-flammability, low GWP, improved lubricant miscibility and improved performance properties when used in heat pump and/or air-conditioning systems of vehicles, especially electric vehicles. Some of these properties are explained in more detail below.

For example, the compositions of the present invention have a temperature glide in an evaporator or condenser of less than about 12K, such as less than about 10K, for example less than about 5K Advantageously, the compositions of the present invention can operate in a heat pump mode at a temperature of less than about −15° C., such as less than about −20° C., preferably whilst still having an evaporation pressure and compressor suction pressure above atmospheric pressure Typically, the compositions of the invention have heating capacity which is greater than or about equal to that of R-1234yf.

Conveniently, the compositions of the present invention have a volumetric cooling capacity which is greater than or about equal to that of R-1234yf.

Advantageously, the compositions of the present invention have a cycle efficiency (coefficient of performance (COP)) which is greater than or about equal to that of R-1234yf.

Typically, the compositions of the present invention evaporate at a temperature of below about −30° C. when in operation. This enables heat pump operation at ambient air temperatures as low as −25° C. to −30° C.

Conveniently, the compositions of the present invention condense at a temperature of above about 40° C. when in operation. This is particularly desirable, since passenger air flow from the vent into the cabin is ideally heated to a temperature of from about 40° C. to about 50° C.

Typically, the compressor discharge temperature of the compositions of the present invention is within about 15K of the existing refrigerant fluid (such as R-1234yf) they are replacing, preferably within about 10K or about 5K.

The compositions of the invention are typically suitable for use in existing designs of equipment and are compatible with all classes of lubricant currently used with established HFC refrigerants. They may be optionally stabilized or compatibilized with mineral oils by the use of appropriate additives.

Preferably, when used in a heat transfer equipment, the composition of the present invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof, such as wherein the lubricant is selected from the group consisting of polyol esters (POEs), polyalkylene glycols (PAGs) and combinations thereof.

In one embodiment, the compositions of the invention contain substantially no trifluoroiodomethane ($CF_3I$).

All the chemicals described herein are commercially available. For example, fluorochemicals may be obtained from Apollo Scientific (UK).

The compositions of the invention may be prepared by simply mixing R-1132a, R-32 and R-1234yf (and optional components, such as a lubricant) in the desired proportions. The compositions can then be added to a heat transfer device or used in any other way as described herein.

According to another aspect of the present invention, there is provided a use of a composition of the invention as a working fluid in a heat pump system of a vehicle (such as an electric vehicle).

In another aspect of the invention, there is provided a use of a composition of the present invention as a working fluid in an air-conditioning system of a vehicle (e.g. an electric vehicle).

In a further aspect of the present invention, there is provided a use of a compositions of the invention as a replacement for an existing heat transfer fluid in a refrigeration or air-conditioning system, preferably wherein the existing fluid is R-407C or R-22.

According to a further aspect of the present invention, there is provided a heat transfer device comprising a composition according to the present invention.

Conveniently, the heat transfer device is a refrigeration device or an air-conditioning device.

In one embodiment, the heat transfer device comprises a residential or commercial air conditioning system, an air-conditioning system for a train or bus, a heat pump or a commercial or industrial refrigeration system.

According to another aspect of the invention, there is provided a method for cooling an article which comprises condensing a composition of the present invention and thereafter evaporating said composition in the vicinity of the article to be cooled.

According to another aspect of the invention, there is provided a method for heating an article which comprises condensing a composition according to the present invention in the vicinity of the article to be heated and thereafter evaporating said composition.

The present invention is illustrated by the following non-limiting examples.

EXAMPLES

A thermodynamic model of the R-1132a/R-32/R-1234yf fluid system was built using the Span-Wagner equation of state as implemented in NIST REFPROP9.1 software. A pure fluid model for R-1132a was derived by measuring its vapour pressure from boiling point to critical point, determining the critical point, measuring compressed liquid and vapour densities and measuring enthalpy content and heat capacity of the fluid in liquid and vapour states. Next, the vapour-liquid equilibrium behaviour of the binary mixtures of R-1132a with R-32 and R-1234yf was measured using constant-volume apparatus to measure the vapour pressure of a series of binary compositions over a range of temperatures and pressures from about −50° C. to +70° C. These data were then regressed to provide binary interaction parameters suitable for use in modelling performance of ternary mixtures as refrigerants using standard cycle modelling techniques.

Subsequently, a refrigeration/heat pump cycle was constructed in Microsoft Excel, linked to the REFPROP software to provide thermodynamic property data for the mixtures. This model was used to estimate the performance of R-1234yf in air-conditioning mode and heat pump mode. The model was then used to estimate the performance of the fluids of the invention at the same delivered cooling or heating capacities.

Example 1: Cooling Mode Performance

The compositions of the invention were modelled in cooling mode with R-1234yf as a reference. The cycle conditions used were as follows:

TABLE 1

Cycle modelling conditions (Cooling Mode)

| Data Input Section | | R1234yF |
|---|---|---|
| Target cooling capacity | kW | 6 |
| Compressor displacement | m3/hr | 11.35 |
| Mean condenser temperature | ° C. | 45.0 |
| Mean evaporator temperature | ° C. | 5.0 |
| Condenser subcooling | K. | 3.0 |
| Evaporator superheat | K. | 1.0 |
| Evaporator pressure drop | bar | 0.40 |
| Suction line pressure drop | bar | 0.20 |
| Condenser pressure drop | bar | 0.20 |
| Compressor suction superheat | K. | 10.0 |
| Isentropic efficiency | | 65.0% |

The performance of selected compositions of the invention in cooling mode is given in Tables 1 to 8 below. In the modelling, the anticipated pressure drops in the components for the compositions was estimated by reference to the specified pressure drops for R-1234yf. The compressor displacement required to deliver the stated cooling capacity was calculated for each fluid and compared to R-1234yf.

It can be seen from the performance data that the compositions of the invention offer the following:

(a) Improved energy efficiency (expressed as Coefficient of Performance) as compared to that of R-1234yf;

(b) Higher volumetric cooling capacity than that of R-1234yf. This makes it possible to either use a smaller displacement of compressor (thus saving weight and/or space) or use a compressor running at a lower speed. The ability to run air-conditioning with a low compressor speed is an important benefit for EV systems, because lower compressor speeds translate to lower transmitted noise of the air-conditioning system in the passenger cabin, thereby further improving the passengers' comfort;

(c) Moderate temperature glide in an evaporator and condenser.

Example 2: Heating Mode Performance

The model was then used to simulate performance of selected compositions of the invention using the following cycle input conditions

TABLE 2

Cycle modelling conditions (Heating Mode)

| Data Input Section | | R1234yF |
|---|---|---|
| Target heating capacity | kW | 5 |
| Compressor displacement | m3/hr | 20.38 |
| Mean condenser temperature | ° C. | 55.0 |
| Mean evaporator temperature | ° C. | −15.0 |
| Condenser subcooling | K. | 3.0 |
| Evaporator superheat | K. | 1.0 |
| Evaporator pressure drop | bar | 0.50 |
| Suction line pressure drop | bar | 0.30 |
| Condenser pressure drop | bar | 0.30 |
| Compressor suction superheat | K. | 10.0 |
| Isentropic efficiency | | 65.0% |

The chosen evaporator and condenser temperatures correspond to operation with external ambient air at about −10° C. and a desired air delivery temperature for the cabin of about 50° C.

The performance of selected compositions of the invention in heating mode is shown in Tables 9 to 16 below.

It can be seen from the performance data that the compositions of the invention offer the following benefits:

(a) Much higher heating capacities than that of R-1234yf;

(b) Improved energy efficiency (expressed as COP) as compared to that of R-1234yf;

(c) Higher suction pressures, thereby making it possible to operate the heat pump at lower ambient temperatures than is feasible/practicable with R-1234yf;

(d) Moderate temperature glides (generally less than about 10K).

Example 3: Experimental Testing

A composition comprising 8 weight % R-1132a, 11 weight % R-32 and 81 weight % R-1234yf was tested in the air-conditioner/heat pump system of a Nissan Leaf electric vehicle over a range of cooling mode and heating mode conditions. This system has been designed for use with R-1234yf. The testing was conducted according to the SAE J2765 standard for evaluation of performance of mobile air-conditioning systems. Testing was run for the blend in two states: firstly, with the same compressor speed as used for R-1234yf; secondly, with the compressor speed adjusted so that the blend gave equivalent cooling or heating capacity.

Figure 2:
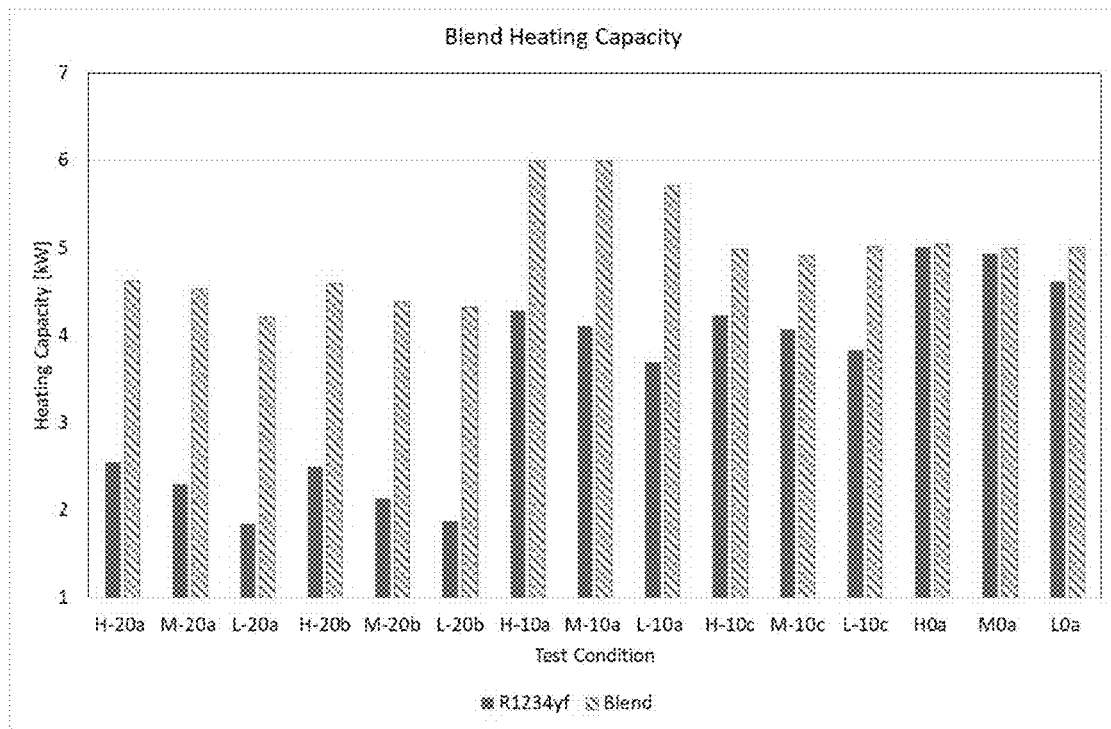

The performance in cooling and heating modes is shown in FIGS. 1 and 2. The legend notation shows the compressor speed (Idle/Medium/High) and the ambient temperature for each test point. Ambient temperatures in cooling mode were from 25° C. to 60° C.; in heating mode from −20° C. to 0° C.

It can be seen that the blend gave significantly increased energy efficiency in cooling mode and significantly increased heating capacity at low ambient temperatures in heating mode, in line with the modelled results from Examples 1 and 2.

TABLE 1

(Cooling mode): Compositions comprising 3 weight % R-1132a

| Results | | R1234yf | R1132a 3% / R32 8% / R1234yf 89% | 3% / 10% / 87% | 3% / 12% / 85% | 3% / 14% / 83% | 3% / 16% / 81% | 3% / 18% / 79% | 3% / 20% / 77% | 3% / 21% / 76% |
|---|---|---|---|---|---|---|---|---|---|---|
| Cooling COP | | 2.97 | 3.13 | 3.14 | 3.16 | 3.17 | 3.17 | 3.18 | 3.18 | 3.18 |
| Cooling COP relative to Reference | | 100.0% | 105.4% | 105.9% | 106.3% | 106.6% | 106.8% | 107.0% | 107.1% | 107.0% |
| Volumetric cooling capacity | kJ/m3 | 1902 | 2712 | 2839 | 2959 | 3073 | 3182 | 3286 | 3386 | 3431 |
| Cooling Capacity relative to Reference | | 100.0% | 142.6% | 149.2% | 155.6% | 161.6% | 167.3% | 172.7% | 178.0% | 180.4% |
| Heating COP | | 3.97 | 4.13 | 4.14 | 4.16 | 4.17 | 4.17 | 4.18 | 4.18 | 4.18 |
| Volumetric heating Capacity | kJ/m3 | 2715 | 3798 | 3968 | 4130 | 4283 | 4430 | 4571 | 4706 | 4769 |
| Heating Capacity relative to Reference | | 100.0% | 139.9% | 146.2% | 152.1% | 157.8% | 163.2% | 168.4% | 173.3% | 175.6% |
| Cooling capacity | kW | 6.00 | 6.00 | 6.00 | 6.00 | 6.00 | 6.00 | 6.01 | 6.00 | 6.08 |
| Heating capacity | kW | 8.56 | 8.40 | 8.39 | 8.37 | 8.36 | 8.36 | 8.35 | 8.34 | 8.45 |
| Refrigeration effect | kJ/kg | 109.1 | 123.6 | 125.8 | 128.0 | 130.0 | 132.0 | 133.9 | 135.8 | 136.7 |
| Pressure ratio | | 3.49 | 3.33 | 3.30 | 3.27 | 3.24 | 3.22 | 3.19 | 3.17 | 3.17 |
| Compressor discharge temperature | °C. | 65.2 | 72.9 | 74.0 | 75.0 | 75.9 | 76.8 | 77.6 | 78.4 | 78.8 |
| Discharge temp. difference from reference | K | 0.0 | 7.8 | 8.8 | 9.8 | 10.8 | 11.6 | 12.5 | 13.2 | 13.7 |
| Evaporator inlet pressure | bar | 3.93 | 5.04 | 5.25 | 5.45 | 5.64 | 5.83 | 6.01 | 6.19 | 6.28 |
| Condenser inlet pressure | bar | 11.64 | 15.55 | 16.15 | 16.72 | 17.27 | 17.80 | 18.30 | 18.79 | 19.03 |
| Evaporator inlet temperature | °C. | 6.6 | 3.1 | 2.8 | 2.5 | 2.3 | 2.2 | 2.1 | 2.1 | 2.1 |
| Evaporator dewpoint | °C. | 3.4 | 6.9 | 7.2 | 7.5 | 7.7 | 7.8 | 7.9 | 7.9 | 7.9 |
| Evaporator exit gas temperature | °C. | 4.4 | 7.9 | 8.2 | 8.5 | 8.7 | 8.8 | 8.9 | 8.9 | 8.9 |
| Evaporator glide (out-in) | K | −3.3 | 3.7 | 4.4 | 4.9 | 5.3 | 5.6 | 5.7 | 5.8 | 5.8 |
| Compressor suction pressure | bar | 3.33 | 4.67 | 4.90 | 5.12 | 5.33 | 5.53 | 5.73 | 5.92 | 6.01 |
| Compressor discharge pressure | bar | 11.6 | 15.6 | 16.1 | 16.7 | 17.3 | 17.8 | 18.3 | 18.8 | 19.0 |
| Condenser dew point | °C. | 45.4 | 49.2 | 49.3 | 49.4 | 49.4 | 49.4 | 49.3 | 49.2 | 49.1 |
| Condenser bubble point | °C. | 44.6 | 40.8 | 40.7 | 40.6 | 40.6 | 40.6 | 40.7 | 40.8 | 40.9 |
| Condenser exit liquid temperature | °C. | 41.6 | 37.8 | 37.7 | 37.6 | 37.6 | 37.6 | 37.7 | 37.8 | 37.9 |
| Condenser glide (in-out) | K | 0.7 | 8.4 | 8.7 | 8.8 | 8.8 | 8.7 | 8.6 | 8.3 | 8.2 |

TABLE 2

(Cooling mode): Compositions comprising 4 weight % R-1132a

| Results | | R1234yf | R1132a 4% / R32 8% / R1234yf 88% | 4% / 10% / 86% | 4% / 12% / 84% | 4% / 14% / 82% | 4% / 16% / 80% | 4% / 18% / 78% | 4% / 20% / 76% | 4% / 21% / 75% |
|---|---|---|---|---|---|---|---|---|---|---|
| Cooling COP | | 2.97 | 3.13 | 3.14 | 3.15 | 3.16 | 3.17 | 3.17 | 3.17 | 3.17 |
| Cooling COP relative to Reference | | 100.0% | 105.4% | 105.8% | 106.2% | 106.5% | 106.7% | 106.8% | 106.8% | 106.9% |
| Volumetric cooling capacity | kJ/m3 | 1902 | 2779 | 2905 | 3025 | 3138 | 3247 | 3350 | 3449 | 3497 |

TABLE 2-continued (Cooling mode): Compositions comprising 4 weight % R-1132a

| Results | | R1234yf | R1132a<br>R32<br>R1234yf | 4%<br>8%<br>88% | 4%<br>10%<br>86% | 4%<br>12%<br>84% | 4%<br>14%<br>82% | 4%<br>16%<br>80% | 4%<br>18%<br>78% | 4%<br>20%<br>76% | 4%<br>21%<br>75% |
|---|---|---|---|---|---|---|---|---|---|---|---|
| Cooling Capacity relative to Reference | | 100.0% | | 146.1% | 152.7% | 159.0% | 165.0% | 170.7% | 176.1% | 181.3% | 183.9% |
| Heating COP | | 3.97 | | 4.13 | 4.14 | 4.15 | 4.16 | 4.17 | 4.17 | 4.17 | 4.17 |
| Volumetric heating Capacity | kJ/m3 | 2715 | | 3891 | 4061 | 4222 | 4375 | 4522 | 4662 | 4797 | 4862 |
| Heating Capacity relative to Reference | | 100.0% | | 143.3% | 149.6% | 155.5% | 161.1% | 166.5% | 171.7% | 176.7% | 179.1% |
| Cooling capacity | kW | 6.00 | | 6.00 | 6.00 | 6.00 | 6.00 | 6.00 | 6.00 | 6.00 | 6.00 |
| Heating capacity | kW | 8.56 | | 8.40 | 8.39 | 8.37 | 8.36 | 8.35 | 8.35 | 8.34 | 8.35 |
| Refrigeration effect | kJ/kg | 109.1 | | 124.2 | 126.4 | 128.4 | 130.4 | 132.3 | 134.2 | 136.1 | 137.0 |
| Pressure ratio | | 3.49 | | 3.32 | 3.29 | 3.26 | 3.23 | 3.21 | 3.19 | 3.17 | 3.16 |
| Compressor discharge temperature | °C. | 65.2 | | 73.5 | 74.6 | 75.5 | 76.4 | 77.3 | 78.1 | 78.9 | 79.3 |
| Discharge temp. difference from reference | K | 0.0 | | 8.3 | 9.4 | 10.4 | 11.3 | 12.1 | 12.9 | 13.7 | 14.1 |
| Evaporator inlet pressure | bar | 3.93 | | 5.16 | 5.36 | 5.57 | 5.76 | 5.95 | 6.14 | 6.32 | 6.41 |
| Condenser inlet pressure | bar | 11.64 | | 15.93 | 16.53 | 17.10 | 17.65 | 18.18 | 18.69 | 19.18 | 19.42 |
| Evaporator inlet temperature | °C. | 6.6 | | 2.8 | 2.5 | 2.3 | 2.1 | 2.0 | 1.9 | 1.9 | 1.9 |
| Evaporator dewpoint | °C. | 3.4 | | 7.2 | 7.5 | 7.7 | 7.9 | 8.0 | 8.1 | 8.1 | 8.1 |
| Evaporator exit gas temperature | °C. | 4.4 | | 8.2 | 8.5 | 8.7 | 8.9 | 9.0 | 9.1 | 9.1 | 9.1 |
| Evaporator glide (out-in) | K | −3.3 | | 4.3 | 4.9 | 5.4 | 5.8 | 6.0 | 6.1 | 6.2 | 6.2 |
| Compressor suction pressure | bar | 3.33 | | 4.80 | 5.02 | 5.24 | 5.46 | 5.66 | 5.86 | 6.05 | 6.15 |
| Compressor discharge pressure | bar | 11.6 | | 15.9 | 16.5 | 17.1 | 17.6 | 18.2 | 18.7 | 19.2 | 19.4 |
| Condenser dew point | °C. | 45.4 | | 49.5 | 49.6 | 49.7 | 49.7 | 49.6 | 49.5 | 49.4 | 49.3 |
| Condenser bubble point | °C. | 44.6 | | 40.5 | 40.4 | 40.3 | 40.3 | 40.4 | 40.5 | 40.6 | 40.7 |
| Condenser exit liquid temperature | °C. | 41.6 | | 37.5 | 37.4 | 37.3 | 37.3 | 37.4 | 37.5 | 37.6 | 37.7 |
| Condenser glide (in-out) | K | 0.7 | | 9.0 | 9.3 | 9.3 | 9.3 | 9.2 | 9.0 | 8.7 | 8.6 |

TABLE 3

(Cooling mode): Compositions comprising 5 weight % R-1132a

| Results | | R1234yf | R1132a<br>R32<br>R1234yf | 5%<br>8%<br>87% | 5%<br>10%<br>85% | 5%<br>12%<br>83% | 5%<br>14%<br>81% | 5%<br>16%<br>79% | 5%<br>18%<br>77% | 5%<br>20%<br>75% | 5%<br>21%<br>74% |
|---|---|---|---|---|---|---|---|---|---|---|---|
| Cooling COP | | 2.97 | | 3.13 | 3.14 | 3.15 | 3.16 | 3.16 | 3.16 | 3.16 | 3.17 |
| Cooling COP relative to Reference | | 100.0% | | 105.4% | 105.8% | 106.1% | 106.3% | 106.5% | 106.6% | 106.6% | 106.6% |
| Volumetric cooling capacity | kJ/m3 | 1902 | | 2846 | 2971 | 3091 | 3203 | 3311 | 3414 | 3512 | 3561 |
| Cooling Capacity relative to Reference | | 100.0% | | 149.6% | 156.2% | 162.5% | 168.4% | 174.0% | 179.4% | 184.6% | 187.2% |
| Heating COP | | 3.97 | | 4.13 | 4.14 | 4.15 | 4.16 | 4.16 | 4.16 | 4.16 | 4.17 |
| Volumetric heating Capacity | kJ/m3 | 2715 | | 3984 | 4153 | 4314 | 4467 | 4613 | 4753 | 4887 | 4953 |
| Heating Capacity relative to Reference | | 100.0% | | 146.8% | 153.0% | 158.9% | 164.5% | 169.9% | 175.0% | 180.0% | 182.4% |
| Cooling capacity | kW | 6.00 | | 6.00 | 6.00 | 5.99 | 6.00 | 6.00 | 6.00 | 6.00 | 6.00 |
| Heating capacity | kW | 8.56 | | 8.40 | 8.39 | 8.36 | 8.36 | 8.35 | 8.36 | 8.35 | 8.35 |

TABLE 3-continued (Cooling mode): Compositions comprising 5 weight % R-1132a

| Results | | R1234yf | R1132a<br>R32<br>R1234yf | 5%<br>8%<br>87% | 5%<br>10%<br>85% | 5%<br>12%<br>83% | 5%<br>14%<br>81% | 5%<br>16%<br>79% | 5%<br>18%<br>77% | 5%<br>20%<br>75% | 5%<br>21%<br>74% |
|---|---|---|---|---|---|---|---|---|---|---|---|
| Refrigeration effect | kJ/kg | 109.1 | | 124.8 | 126.9 | 128.9 | 130.8 | 132.7 | 134.5 | 136.4 | 137.3 |
| Pressure ratio | | 3.49 | | 3.31 | 3.28 | 3.25 | 3.23 | 3.20 | 3.18 | 3.16 | 3.15 |
| Compressor discharge temperature | °C. | 65.2 | | 74.1 | 75.1 | 76.0 | 76.9 | 77.8 | 78.6 | 79.3 | 79.7 |
| Discharge temp. difference from reference | K | 0.0 | | 8.9 | 9.9 | 10.9 | 11.8 | 12.6 | 13.4 | 14.2 | 14.5 |
| Evaporator inlet pressure | bar | 3.93 | | 5.27 | 5.48 | 5.69 | 5.88 | 6.08 | 6.27 | 6.45 | 6.54 |
| Condenser inlet pressure | bar | 11.64 | | 16.31 | 16.91 | 17.48 | 18.03 | 18.56 | 19.07 | 19.57 | 19.81 |
| Evaporator inlet temperature | °C. | 6.6 | | 2.6 | 2.3 | 2.1 | 1.9 | 1.8 | 1.7 | 1.7 | 1.7 |
| Evaporator dewpoint | °C. | 3.4 | | 7.4 | 7.7 | 7.9 | 8.1 | 8.2 | 8.3 | 8.3 | 8.3 |
| Evaporator exit gas temperature | °C. | 4.4 | | 8.4 | 8.7 | 8.9 | 9.1 | 9.2 | 9.3 | 9.3 | 9.3 |
| Evaporator glide (out-in) | K | −3.3 | | 4.9 | 5.4 | 5.9 | 6.2 | 6.4 | 6.5 | 6.5 | 6.5 |
| Compressor suction pressure | bar | 3.33 | | 4.92 | 5.15 | 5.37 | 5.59 | 5.79 | 5.99 | 6.19 | 6.28 |
| Compressor discharge pressure | bar | 11.6 | | 16.3 | 16.9 | 17.5 | 18.0 | 18.6 | 19.1 | 19.6 | 19.8 |
| Condenser dew point | °C. | 45.4 | | 49.8 | 49.9 | 49.9 | 49.9 | 49.8 | 49.7 | 49.6 | 49.5 |
| Condenser bubble point | °C. | 44.6 | | 40.2 | 40.1 | 40.1 | 40.1 | 40.2 | 40.3 | 40.4 | 40.5 |
| Condenser exit liquid temperature | °C. | 41.6 | | 37.2 | 37.1 | 37.1 | 37.1 | 37.2 | 37.3 | 37.4 | 37.5 |
| Condenser glide (in-out) | K | 0.7 | | 9.6 | 9.8 | 9.8 | 9.8 | 9.6 | 9.4 | 9.1 | 9.0 |

TABLE 4

(Cooling mode): Compositions comprising 6 weight % R-1132a

| Results | | R1234yf | R1132a<br>R32<br>R1234yf | 6%<br>8%<br>86% | 6%<br>10%<br>84% | 6%<br>12%<br>82% | 6%<br>14%<br>80% | 6%<br>16%<br>78% | 6%<br>18%<br>76% | 6%<br>20%<br>74% | 6%<br>21%<br>73% |
|---|---|---|---|---|---|---|---|---|---|---|---|
| Cooling COP | | 2.97 | | 3.13 | 3.14 | 3.15 | 3.15 | 3.15 | 3.16 | 3.16 | 3.16 |
| Cooling COP relative to Reference | | 100.0% | | 105.3% | 105.7% | 106.0% | 106.1% | 106.3% | 106.3% | 106.3% | 106.4% |
| Volumetric cooling capacity | kJ/m3 | 1902 | | 2913 | 3038 | 3155 | 3267 | 3375 | 3477 | 3575 | 3624 |
| Cooling Capacity relative to Reference | | 100.0% | | 153.1% | 159.7% | 165.9% | 171.8% | 177.4% | 182.8% | 188.0% | 190.5% |
| Heating COP | | 3.97 | | 4.13 | 4.14 | 4.15 | 4.15 | 4.15 | 4.16 | 4.16 | 4.16 |
| Volumetric heating Capacity | kJ/m3 | 2715 | | 4078 | 4246 | 4405 | 4557 | 4703 | 4843 | 4978 | 5043 |
| Heating Capacity relative to Reference | | 100.0% | | 150.2% | 156.4% | 162.3% | 167.9% | 173.2% | 178.4% | 183.3% | 185.8% |
| Cooling capacity | kW | 6.00 | | 6.00 | 6.00 | 6.00 | 6.01 | 6.01 | 6.00 | 6.01 | 6.00 |
| Heating capacity | kW | 8.56 | | 8.40 | 8.39 | 8.38 | 8.38 | 8.37 | 8.35 | 8.37 | 8.35 |
| Refrigeration effect | kJ/kg | 109.1 | | 125.3 | 127.4 | 129.3 | 131.2 | 133.0 | 134.8 | 136.6 | 137.5 |
| Pressure ratio | | 3.49 | | 3.30 | 3.27 | 3.25 | 3.22 | 3.20 | 3.18 | 3.16 | 3.15 |
| Compressor discharge temperature | °C. | 65.2 | | 74.6 | 75.6 | 76.5 | 77.4 | 78.2 | 79.0 | 79.8 | 80.1 |
| Discharge temp. difference from reference | K | 0.0 | | 9.4 | 10.4 | 11.4 | 12.2 | 13.1 | 13.8 | 14.6 | 15.0 |
| Evaporator inlet pressure | bar | 3.93 | | 5.39 | 5.60 | 5.81 | 6.01 | 6.20 | 6.39 | 6.58 | 6.67 |

TABLE 4-continued (Cooling mode): Compositions comprising 6 weight % R-1132a

| Results | | R1234yf | R1132a<br>R32<br>R1234yf | 6%<br>8%<br>86% | 6%<br>10%<br>84% | 6%<br>12%<br>82% | 6%<br>14%<br>80% | 6%<br>16%<br>78% | 6%<br>18%<br>76% | 6%<br>20%<br>74% | 6%<br>21%<br>73% |
|---|---|---|---|---|---|---|---|---|---|---|---|
| Condenser inlet pressure | bar | 11.64 | | 16.69 | 17.29 | 17.86 | 18.41 | 18.95 | 19.46 | 19.96 | 20.20 |
| Evaporator inlet temperature | ° C. | 6.6 | | 2.3 | 2.0 | 1.8 | 1.7 | 1.6 | 1.6 | 1.6 | 1.6 |
| Evaporator dewpoint | ° C. | 3.4 | | 7.7 | 8.0 | 8.2 | 8.3 | 8.4 | 8.4 | 8.4 | 8.4 |
| Evaporator exit gas temperature | ° C. | 4.4 | | 8.7 | 9.0 | 9.2 | 9.3 | 9.4 | 9.4 | 9.4 | 9.4 |
| Evaporator glide (out-in) | K | −3.3 | | 5.4 | 5.9 | 6.3 | 6.6 | 6.8 | 6.9 | 6.9 | 6.8 |
| Compressor suction pressure | bar | 3.33 | | 5.05 | 5.28 | 5.50 | 5.72 | 5.93 | 6.13 | 6.32 | 6.42 |
| Compressor discharge pressure | bar | 11.6 | | 16.7 | 17.3 | 17.9 | 18.4 | 18.9 | 19.5 | 20.0 | 20.2 |
| Condenser dew point | ° C. | 45.4 | | 50.1 | 50.1 | 50.1 | 50.1 | 50.0 | 49.9 | 49.7 | 49.6 |
| Condenser bubble point | ° C. | 44.6 | | 39.9 | 39.9 | 39.9 | 39.9 | 40.0 | 40.1 | 40.3 | 40.4 |
| Condenser exit liquid temperature | ° C. | 41.6 | | 36.9 | 36.9 | 36.9 | 36.9 | 37.0 | 37.1 | 37.3 | 37.4 |
| Condenser glide (in-out) | K | 0.7 | | 10.2 | 10.3 | 10.3 | 10.2 | 10.0 | 9.7 | 9.4 | 9.3 |

TABLE 5

(Cooling mode): Compositions comprising 7 weight % R-1132a

| Results | | R1234yf | R1132a<br>R32<br>R1234yf | 7%<br>8%<br>85% | 7%<br>10%<br>83% | 7%<br>12%<br>81% | 7%<br>14%<br>79% | 7%<br>16%<br>77% | 7%<br>18%<br>75% | 7%<br>20%<br>73% | 7%<br>21%<br>72% |
|---|---|---|---|---|---|---|---|---|---|---|---|
| Cooling COP | | 2.97 | | 3.13 | 3.14 | 3.14 | 3.15 | 3.15 | 3.15 | 3.15 | 3.15 |
| Cooling COP relative to Reference | | 100.0% | | 105.3% | 105.6% | 105.8% | 106.0% | 106.1% | 106.1% | 106.1% | 106.1% |
| Volumetric cooling capacity | kJ/m3 | 1902 | | 2979 | 3103 | 3220 | 3332 | 3439 | 3540 | 3638 | 3686 |
| Cooling Capacity relative to Reference | | 100.0% | | 156.6% | 163.1% | 169.3% | 175.2% | 180.8% | 186.1% | 191.2% | 193.8% |
| Heating COP | | 3.97 | | 4.13 | 4.14 | 4.14 | 4.15 | 4.15 | 4.15 | 4.15 | 4.15 |
| Volumetric heating Capacity | kJ/m3 | 2715 | | 4171 | 4338 | 4497 | 4649 | 4794 | 4933 | 5068 | 5133 |
| Heating Capacity relative to Reference | | 100.0% | | 153.6% | 159.8% | 165.6% | 171.2% | 176.6% | 181.7% | 186.7% | 189.1% |
| Cooling capacity | kW | 6.00 | | 6.00 | 6.00 | 6.00 | 6.00 | 6.00 | 6.01 | 6.00 | 6.00 |
| Heating capacity | kW | 8.56 | | 8.40 | 8.39 | 8.38 | 8.37 | 8.36 | 8.37 | 8.36 | 8.36 |
| Refrigeration effect | kJ/kg | 109.1 | | 125.8 | 127.8 | 129.7 | 131.5 | 133.3 | 135.1 | 136.8 | 137.7 |
| Pressure ratio | | 3.49 | | 3.29 | 3.27 | 3.24 | 3.21 | 3.19 | 3.17 | 3.15 | 3.14 |
| Compressor discharge temperature | ° C. | 65.2 | | 75.1 | 76.1 | 77.0 | 77.9 | 78.7 | 79.5 | 80.2 | 80.5 |
| Discharge temp. difference from reference | K | 0.0 | | 10.0 | 10.9 | 11.8 | 12.7 | 13.5 | 14.3 | 15.0 | 15.4 |
| Evaporator inlet pressure | bar | 3.93 | | 5.51 | 5.73 | 5.93 | 6.14 | 6.33 | 6.52 | 6.71 | 6.80 |
| Condenser inlet pressure | bar | 11.64 | | 17.07 | 17.67 | 18.24 | 18.80 | 19.33 | 19.85 | 20.35 | 20.59 |
| Evaporator inlet temperature | ° C. | 6.6 | | 2.1 | 1.8 | 1.6 | 1.5 | 1.4 | 1.4 | 1.4 | 1.4 |
| Evaporator dewpoint | ° C. | 3.4 | | 7.9 | 8.2 | 8.4 | 8.5 | 8.6 | 8.6 | 8.6 | 8.6 |
| Evaporator exit gas temperature | ° C. | 4.4 | | 8.9 | 9.2 | 9.4 | 9.5 | 9.6 | 9.6 | 9.6 | 9.6 |
| Evaporator glide (out-in) | K | −3.3 | | 5.9 | 6.4 | 6.8 | 7.0 | 7.2 | 7.2 | 7.2 | 7.2 |
| Compressor suction pressure | bar | 3.33 | | 5.18 | 5.41 | 5.63 | 5.85 | 6.06 | 6.26 | 6.46 | 6.55 |

TABLE 5-continued (Cooling mode): Compositions comprising 7 weight % R-1132a

| Results | | R1234yf | R1132a<br>R32<br>R1234yf | 7%<br>8%<br>85% | 7%<br>10%<br>83% | 7%<br>12%<br>81% | 7%<br>14%<br>79% | 7%<br>16%<br>77% | 7%<br>18%<br>75% | 7%<br>20%<br>73% | 7%<br>21%<br>72% |
|---|---|---|---|---|---|---|---|---|---|---|---|
| Compressor discharge pressure | bar | 11.6 | | 17.1 | 17.7 | 18.2 | 18.8 | 19.3 | 19.8 | 20.3 | 20.6 |
| Condenser dew point | °C. | 45.4 | | 50.3 | 50.4 | 50.4 | 50.3 | 50.2 | 50.0 | 49.9 | 49.8 |
| Condenser bubble point | °C. | 44.6 | | 39.7 | 39.6 | 39.6 | 39.7 | 39.8 | 40.0 | 40.1 | 40.2 |
| Condenser exit liquid temperature | °C. | 41.6 | | 36.7 | 36.6 | 36.6 | 36.7 | 36.8 | 37.0 | 37.1 | 37.2 |
| Condenser glide (in-out) | K | 0.7 | | 10.7 | 10.8 | 10.7 | 10.6 | 10.3 | 10.1 | 9.8 | 9.6 |

TABLE 6

(Cooling mode): Compositions comprising 8 weight % R-1132a

| Results | | R1234yf | R1132a<br>R32<br>R1234yf | 8%<br>8%<br>84% | 8%<br>10%<br>82% | 8%<br>12%<br>80% | 8%<br>14%<br>78% | 8%<br>16%<br>76% | 8%<br>18%<br>74% | 8%<br>20%<br>72% | 8%<br>21%<br>71% |
|---|---|---|---|---|---|---|---|---|---|---|---|
| Cooling COP | | 2.97 | | 3.12 | 3.13 | 3.14 | 3.14 | 3.14 | 3.14 | 3.14 | 3.14 |
| Cooling COP relative to Reference | | 100.0% | | 105.2% | 105.5% | 105.7% | 105.8% | 105.8% | 105.8% | 105.8% | 105.8% |
| Volumetric cooling capacity | kJ/m3 | 1902 | | 3046 | 3168 | 3285 | 3396 | 3502 | 3603 | 3701 | 3748 |
| Cooling Capacity relative to Reference | | 100.0% | | 160.1% | 166.5% | 172.7% | 178.5% | 184.1% | 189.4% | 194.5% | 197.0% |
| Heating COP | | 3.97 | | 4.12 | 4.13 | 4.14 | 4.14 | 4.14 | 4.14 | 4.14 | 4.14 |
| Volumetric heating Capacity | kJ/m3 | 2715 | | 4264 | 4430 | 4589 | 4740 | 4885 | 5024 | 5158 | 5224 |
| Heating Capacity relative to Reference | | 100.0% | | 157.0% | 163.2% | 169.0% | 174.6% | 179.9% | 185.0% | 190.0% | 192.4% |
| Cooling capacity | kW | 6.00 | | 5.99 | 6.01 | 6.00 | 5.99 | 6.00 | 6.00 | 6.00 | 6.00 |
| Heating capacity | kW | 8.56 | | 8.39 | 8.40 | 8.38 | 8.36 | 8.37 | 8.37 | 8.37 | 8.36 |
| Refrigeration effect | kJ/kg | 109.1 | | 126.2 | 128.2 | 130.0 | 131.8 | 133.6 | 135.3 | 137.0 | 137.9 |
| Pressure ratio | | 3.49 | | 3.29 | 3.26 | 3.23 | 3.21 | 3.18 | 3.16 | 3.14 | 3.14 |
| Compressor discharge temperature | °C. | 65.2 | | 75.6 | 76.6 | 77.5 | 78.3 | 79.1 | 79.9 | 80.6 | 81.0 |
| Discharge temp. difference from reference | K | 0.0 | | 10.5 | 11.4 | 12.3 | 13.1 | 13.9 | 14.7 | 15.4 | 15.8 |
| Evaporator inlet pressure | bar | 3.93 | | 5.63 | 5.85 | 6.06 | 6.26 | 6.46 | 6.65 | 6.84 | 6.93 |
| Condenser inlet pressure | bar | 11.64 | | 17.45 | 18.05 | 18.63 | 19.18 | 19.72 | 20.24 | 20.74 | 20.98 |
| Evaporator inlet temperature | °C. | 6.6 | | 1.8 | 1.6 | 1.4 | 1.3 | 1.2 | 1.2 | 1.2 | 1.3 |
| Evaporator dewpoint | °C. | 3.4 | | 8.2 | 8.4 | 8.6 | 8.7 | 8.8 | 8.8 | 8.8 | 8.7 |
| Evaporator exit gas temperature | °C. | 4.4 | | 9.2 | 9.4 | 9.6 | 9.7 | 9.8 | 9.8 | 9.8 | 9.7 |
| Evaporator glide (out-in) | K | −3.3 | | 6.4 | 6.9 | 7.2 | 7.4 | 7.5 | 7.6 | 7.5 | 7.5 |
| Compressor suction pressure | bar | 3.33 | | 5.31 | 5.54 | 5.77 | 5.99 | 6.19 | 6.40 | 6.60 | 6.69 |
| Compressor discharge pressure | bar | 11.6 | | 17.4 | 18.1 | 18.6 | 19.2 | 19.7 | 20.2 | 20.7 | 21.0 |
| Condenser dew point | °C. | 45.4 | | 50.6 | 50.6 | 50.6 | 50.5 | 50.3 | 50.2 | 50.0 | 49.9 |
| Condenser bubble point | °C. | 44.6 | | 39.4 | 39.4 | 39.4 | 39.5 | 39.7 | 39.8 | 40.0 | 40.1 |
| Condenser exit liquid temperature | °C. | 41.6 | | 36.4 | 36.4 | 36.4 | 36.5 | 36.7 | 36.8 | 37.0 | 37.1 |
| Condenser glide (in-out) | K | 0.7 | | 11.2 | 11.2 | 11.1 | 10.9 | 10.7 | 10.4 | 10.0 | 9.9 |

TABLE 7

(Cooling mode): Compositions comprising 9 weight % R-1132a

| Results | | R1234yf | R1132a R32 R1234yf | 9% 8% 83% | 9% 10% 81% | 9% 12% 79% | 9% 14% 77% | 9% 16% 75% | 9% 18% 73% | 9% 20% 71% | 9% 21% 70% |
|---|---|---|---|---|---|---|---|---|---|---|---|
| Cooling COP | | 2.97 | | 3.12 | 3.13 | 3.13 | 3.13 | 3.14 | 3.13 | 3.13 | 3.13 |
| Cooling COP relative to Reference | | 100.0% | | 105.1% | 105.4% | 105.5% | 105.6% | 105.6% | 105.6% | 105.5% | 105.5% |
| Volumetric cooling capacity | kJ/m3 | 1902 | | 3111 | 3233 | 3349 | 3459 | 3565 | 3665 | 3763 | 3808 |
| Cooling Capacity relative to Reference | | 100.0% | | 163.6% | 170.0% | 176.0% | 181.8% | 187.4% | 192.7% | 197.8% | 200.2% |
| Heating COP | | 3.97 | | 4.12 | 4.13 | 4.13 | 4.13 | 4.14 | 4.13 | 4.13 | 4.13 |
| Volumetric heating Capacity | kJ/m3 | 2715 | | 4356 | 4522 | 4679 | 4831 | 4975 | 5114 | 5248 | 5311 |
| Heating Capacity relative to Reference | | 100.0% | | 160.4% | 166.6% | 172.4% | 177.9% | 183.2% | 188.4% | 193.3% | 195.6% |
| Cooling capacity | kW | 6.00 | | 6.01 | 6.00 | 6.01 | 6.01 | 6.00 | 6.01 | 6.01 | 6.05 |
| Heating capacity | kW | 8.56 | | 8.41 | 8.39 | 8.40 | 8.39 | 8.37 | 8.38 | 8.38 | 8.44 |
| Refrigeration effect | kJ/kg | 109.1 | | 126.7 | 128.5 | 130.3 | 132.1 | 133.8 | 135.5 | 137.2 | 138.0 |
| Pressure ratio | | 3.49 | | 3.28 | 3.25 | 3.22 | 3.20 | 3.18 | 3.16 | 3.14 | 3.13 |
| Compressor discharge temperature | °C. | 65.2 | | 76.1 | 77.1 | 77.9 | 78.8 | 79.5 | 80.3 | 81.0 | 81.4 |
| Discharge temp. difference from reference | K | 0.0 | | 10.9 | 11.9 | 12.8 | 13.6 | 14.4 | 15.1 | 15.8 | 16.2 |
| Evaporator inlet pressure | bar | 3.93 | | 5.76 | 5.97 | 6.19 | 6.39 | 6.59 | 6.79 | 6.98 | 7.07 |
| Condenser inlet pressure | bar | 11.64 | | 17.83 | 18.43 | 19.01 | 19.57 | 20.11 | 20.63 | 21.13 | 21.38 |
| Evaporator inlet temperature | °C. | 6.6 | | 1.6 | 1.4 | 1.2 | 1.1 | 1.1 | 1.1 | 1.1 | 1.1 |
| Evaporator dewpoint | °C. | 3.4 | | 8.4 | 8.6 | 8.8 | 8.9 | 8.9 | 8.9 | 8.9 | 8.9 |
| Evaporator exit gas temperature | °C. | 4.4 | | 9.4 | 9.6 | 9.8 | 9.9 | 9.9 | 9.9 | 9.9 | 9.9 |
| Evaporator glide (out-in) | K | −3.3 | | 6.9 | 7.3 | 7.6 | 7.8 | 7.9 | 7.9 | 7.8 | 7.8 |
| Compressor suction pressure | bar | 3.33 | | 5.44 | 5.68 | 5.90 | 6.12 | 6.33 | 6.54 | 6.73 | 6.83 |
| Compressor discharge pressure | bar | 11.6 | | 17.8 | 18.4 | 19.0 | 19.6 | 20.1 | 20.6 | 21.1 | 21.4 |
| Condenser dew point | °C. | 45.4 | | 50.8 | 50.8 | 50.7 | 50.6 | 50.5 | 50.3 | 50.2 | 50.1 |
| Condenser bubble point | °C. | 44.6 | | 39.2 | 39.2 | 39.3 | 39.4 | 39.5 | 39.7 | 39.8 | 39.9 |
| Condenser exit liquid temperature | °C. | 41.6 | | 36.2 | 36.2 | 36.3 | 36.4 | 36.5 | 36.7 | 36.8 | 36.9 |
| Condenser glide (in-out) | K | 0.7 | | 11.6 | 11.6 | 11.5 | 11.3 | 11.0 | 10.7 | 10.3 | 10.1 |

TABLE 8

(Cooling mode): Compositions comprising 10 weight % R-1132a

| Results | | R1234yf | R1132a R32 R1234yf | 10% 8% 82% | 10% 10% 80% | 10% 12% 78% | 10% 14% 76% | 10% 16% 74% | 10% 18% 72% | 10% 20% 70% | 10% 21% 69% |
|---|---|---|---|---|---|---|---|---|---|---|---|
| Cooling COP | | 2.97 | | 3.12 | 3.12 | 3.13 | 3.13 | 3.13 | 3.13 | 3.13 | 3.12 |
| Cooling COP relative to Reference | | 100.0% | | 105.0% | 105.2% | 105.3% | 105.4% | 105.4% | 105.3% | 105.3% | 105.2% |
| Volumetric cooling capacity | kJ/m3 | 1902 | | 3177 | 3298 | 3413 | 3522 | 3627 | 3728 | 3825 | 3871 |
| Cooling Capacity relative to Reference | | 100.0% | | 167.0% | 173.4% | 179.4% | 185.2% | 190.7% | 195.9% | 201.0% | 203.5% |
| Heating COP | | 3.97 | | 4.12 | 4.12 | 4.13 | 4.13 | 4.13 | 4.13 | 4.13 | 4.12 |
| Volumetric heating Capacity | kJ/m3 | 2715 | | 4449 | 4613 | 4771 | 4921 | 5065 | 5204 | 5338 | 5402 |

TABLE 8-continued (Cooling mode): Compositions comprising 10 weight % R-1132a

| Results | | R1234yf | R1132a<br>R32<br>R1234yf | 10%<br>8%<br>82% | 10%<br>10%<br>80% | 10%<br>12%<br>78% | 10%<br>14%<br>76% | 10%<br>16%<br>74% | 10%<br>18%<br>72% | 10%<br>20%<br>70% | 10%<br>21%<br>69% |
|---|---|---|---|---|---|---|---|---|---|---|---|
| Heating Capacity relative to Reference | | 100.0% | | 163.8% | 169.9% | 175.7% | 181.3% | 186.6% | 191.7% | 196.6% | 199.0% |
| Cooling capacity | kW | 6.00 | | 6.00 | 6.01 | 6.00 | 6.01 | 6.00 | 6.01 | 6.00 | 6.02 |
| Heating capacity | kW | 8.56 | | 8.40 | 8.41 | 8.39 | 8.39 | 8.39 | 8.38 | 8.38 | 8.40 |
| Refrigeration effect | kJ/kg | 109.1 | | 127.1 | 128.9 | 130.6 | 132.3 | 134.0 | 135.7 | 137.3 | 138.1 |
| Pressure ratio | | 3.49 | | 3.27 | 3.24 | 3.21 | 3.19 | 3.17 | 3.15 | 3.13 | 3.12 |
| Compressor discharge temperature | °C. | 65.2 | | 76.6 | 77.5 | 78.4 | 79.2 | 79.9 | 80.7 | 81.4 | 81.7 |
| Discharge temp. difference from reference | K | 0.0 | | 11.4 | 12.3 | 13.2 | 14.0 | 14.8 | 15.5 | 16.2 | 16.6 |
| Evaporator inlet pressure | bar | 3.93 | | 5.88 | 6.10 | 6.32 | 6.52 | 6.73 | 6.92 | 7.11 | 7.21 |
| Condenser inlet pressure | bar | 11.64 | | 18.21 | 18.82 | 19.40 | 19.96 | 20.50 | 21.02 | 21.53 | 21.77 |
| Evaporator inlet temperature | °C. | 6.6 | | 1.3 | 1.1 | 1.0 | 0.9 | 0.9 | 0.9 | 0.9 | 1.0 |
| Evaporator dewpoint | °C. | 3.4 | | 8.7 | 8.9 | 9.0 | 9.1 | 9.1 | 9.1 | 9.1 | 9.0 |
| Evaporator exit gas temperature | °C. | 4.4 | | 9.7 | 9.9 | 10.0 | 10.1 | 10.1 | 10.1 | 10.1 | 10.0 |
| Evaporator glide (out-in) | K | −3.3 | | 7.3 | 7.7 | 8.0 | 8.1 | 8.2 | 8.2 | 8.1 | 8.0 |
| Compressor suction pressure | bar | 3.33 | | 5.57 | 5.81 | 6.04 | 6.26 | 6.47 | 6.67 | 6.87 | 6.97 |
| Compressor discharge pressure | bar | 11.6 | | 18.2 | 18.8 | 19.4 | 20.0 | 20.5 | 21.0 | 21.5 | 21.8 |
| Condenser dew point | °C. | 45.4 | | 51.0 | 51.0 | 50.9 | 50.8 | 50.6 | 50.5 | 50.3 | 50.2 |
| Condenser bubble point | °C. | 44.6 | | 39.0 | 39.0 | 39.1 | 39.2 | 39.4 | 39.5 | 39.7 | 39.8 |
| Condenser exit liquid temperature | °C. | 41.6 | | 36.0 | 36.0 | 36.1 | 36.2 | 36.4 | 36.5 | 36.7 | 36.8 |
| Condenser glide (in-out) | K | 0.7 | | 12.0 | 12.0 | 11.8 | 11.6 | 11.3 | 10.9 | 10.5 | 10.4 |

TABLE 9

(Heating mode): Compositions comprising 3 weight % R-1132a

| Results | | R1234yf | R1132a<br>R32<br>R1234yf | 3%<br>8%<br>89% | 3%<br>10%<br>87% | 3%<br>12%<br>85% | 3%<br>14%<br>83% | 3%<br>16%<br>81% | 3%<br>18%<br>79% | 3%<br>20%<br>77% | 3%<br>21%<br>76% |
|---|---|---|---|---|---|---|---|---|---|---|---|
| Cooling COP | | 1.11 | | 1.26 | 1.27 | 1.28 | 1.29 | 1.30 | 1.31 | 1.32 | 1.32 |
| Cooling COP relative to Reference | | 100.0% | | 113.1% | 114.3% | 115.5% | 116.4% | 117.2% | 117.9% | 118.6% | 118.9% |
| Volumetric cooling capacity | kJ/m3 | 560 | | 926 | 986 | 1044 | 1101 | 1156 | 1210 | 1263 | 1288 |
| Cooling Capacity relative to Reference | | 100.0% | | 165.4% | 176.1% | 186.6% | 196.8% | 206.6% | 216.1% | 225.6% | 230.1% |
| Heating COP | | 2.11 | | 2.26 | 2.27 | 2.28 | 2.29 | 2.30 | 2.31 | 2.32 | 2.32 |
| Volumetric heating Capacity | kJ/m3 | 1129 | | 1755 | 1857 | 1958 | 2055 | 2150 | 2242 | 2333 | 2376 |
| Heating Capacity relative to Reference | | 100.0% | | 155.4% | 164.5% | 173.4% | 182.0% | 190.4% | 198.5% | 206.6% | 210.4% |
| Cooling capacity | kW | 2.48 | | 2.64 | 2.66 | 2.67 | 2.68 | 2.69 | 2.70 | 2.70 | 2.71 |
| Heating capacity | kW | 5.00 | | 5.00 | 5.00 | 5.00 | 5.00 | 5.00 | 5.00 | 5.00 | 5.00 |
| Refrigeration effect | kJ/kg | 79.7 | | 93.6 | 95.9 | 98.1 | 100.2 | 102.2 | 104.2 | 106.2 | 107.2 |
| Pressure ratio | | 11.38 | | 9.56 | 9.36 | 9.17 | 8.99 | 8.84 | 8.70 | 8.57 | 8.51 |
| Compressor discharge temperature | °C. | 86.9 | | 95.2 | 96.8 | 98.4 | 99.9 | 101.4 | 102.9 | 104.3 | 105.1 |

TABLE 9-continued (Heating mode): Compositions comprising 3 weight % R-1132a

| Results | | R1234yf | R1132a R32 R1234yf | 3% 8% 89% | 3% 10% 87% | 3% 12% 85% | 3% 14% 83% | 3% 16% 81% | 3% 18% 79% | 3% 20% 77% | 3% 21% 76% |
|---|---|---|---|---|---|---|---|---|---|---|---|
| Discharge temp. difference from reference | K | 0.0 | | 8.2 | 9.8 | 11.4 | 13.0 | 14.5 | 16.0 | 17.4 | 18.1 |
| Evaporator inlet pressure | bar | 2.10 | | 2.51 | 2.60 | 2.70 | 2.79 | 2.89 | 2.98 | 3.07 | 3.12 |
| Condenser inlet pressure | bar | 14.80 | | 19.56 | 20.30 | 21.02 | 21.71 | 22.37 | 23.01 | 23.63 | 23.93 |
| Evaporator inlet temperature | ° C. | −11.5 | | −14.9 | −15.3 | −15.7 | −15.9 | −16.2 | −16.4 | −16.5 | −16.6 |
| Evaporator dewpoint | ° C. | −18.5 | | −15.1 | −14.7 | −14.3 | −14.1 | −13.8 | −13.6 | −13.5 | −13.4 |
| Evaporator exit gas temperature | ° C. | −17.5 | | −14.1 | −13.7 | −13.3 | −13.1 | −12.8 | −12.6 | −12.5 | −12.4 |
| Evaporator glide (out-in) | K | −7.1 | | −0.1 | 0.6 | 1.3 | 1.9 | 2.4 | 2.7 | 3.0 | 3.1 |
| Compressor suction pressure | bar | 1.30 | | 2.05 | 2.17 | 2.29 | 2.41 | 2.53 | 2.64 | 2.76 | 2.81 |
| Compressor discharge pressure | bar | 14.8 | | 19.6 | 20.3 | 21.0 | 21.7 | 22.4 | 23.0 | 23.6 | 23.9 |
| Condenser dew point | ° C. | 55.4 | | 58.9 | 59.0 | 59.0 | 59.0 | 59.0 | 58.9 | 58.8 | 58.7 |
| Condenser bubble point | ° C. | 54.6 | | 51.1 | 51.0 | 51.0 | 51.0 | 51.0 | 51.1 | 51.2 | 51.3 |
| Condenser exit liquid temperature | ° C. | 51.6 | | 48.1 | 48.0 | 48.0 | 48.0 | 48.0 | 48.1 | 48.2 | 48.3 |
| Condenser glide (in-out) | K | 0.9 | | 7.7 | 8.0 | 8.1 | 8.1 | 8.0 | 7.8 | 7.6 | 7.4 |

TABLE 10

(Heating mode): Compositions comprising 4 weight % R-1132a

| Results | | R1234yf | R1132a R32 R1234yf | 4% 8% 88% | 4% 10% 86% | 4% 12% 84% | 4% 14% 82% | 4% 16% 80% | 4% 18% 78% | 4% 20% 76% | 4% 21% 75% |
|---|---|---|---|---|---|---|---|---|---|---|---|
| Cooling COP | | 1.11 | | 1.26 | 1.27 | 1.28 | 1.29 | 1.30 | 1.31 | 1.31 | 1.32 |
| Cooling COP relative to Reference | | 100.0% | | 113.1% | 114.3% | 115.4% | 116.2% | 117.0% | 117.7% | 118.2% | 118.6% |
| Volumetric cooling capacity | kJ/m3 | 560 | | 951 | 1011 | 1069 | 1126 | 1180 | 1235 | 1286 | 1313 |
| Cooling Capacity relative to Reference | | 100.0% | | 169.9% | 180.6% | 191.0% | 201.2% | 210.9% | 220.6% | 229.8% | 234.6% |
| Heating COP | | 2.11 | | 2.26 | 2.27 | 2.28 | 2.29 | 2.30 | 2.31 | 2.31 | 2.32 |
| Volumetric heating Capacity | kJ/m3 | 1129 | | 1802 | 1904 | 2005 | 2102 | 2196 | 2290 | 2379 | 2425 |
| Heating Capacity relative to Reference | | 100.0% | | 159.5% | 168.6% | 177.5% | 186.2% | 194.5% | 202.8% | 210.6% | 214.7% |
| Cooling capacity | kW | 2.48 | | 2.64 | 2.66 | 2.67 | 2.68 | 2.69 | 2.70 | 2.72 | 2.70 |
| Heating capacity | kW | 5.00 | | 5.00 | 5.01 | 5.01 | 5.00 | 5.02 | 5.00 | 5.02 | 4.98 |
| Refrigeration effect | kJ/kg | 79.7 | | 94.1 | 96.3 | 98.5 | 100.5 | 102.5 | 104.5 | 106.4 | 107.4 |
| Pressure ratio | | 11.38 | | 9.50 | 9.30 | 9.12 | 8.95 | 8.81 | 8.66 | 8.54 | 8.48 |
| Compressor discharge temperature | ° C. | 86.9 | | 95.8 | 97.4 | 99.0 | 100.5 | 102.1 | 103.5 | 105.0 | 105.7 |
| Discharge temp. difference from reference | K | 0.0 | | 8.9 | 10.5 | 12.1 | 13.6 | 15.1 | 16.6 | 18.0 | 18.7 |
| Evaporator inlet pressure | bar | 2.10 | | 2.56 | 2.65 | 2.75 | 2.84 | 2.94 | 3.04 | 3.13 | 3.18 |
| Condenser inlet pressure | bar | 14.80 | | 20.01 | 20.76 | 21.47 | 22.16 | 22.83 | 23.47 | 24.09 | 24.39 |
| Evaporator inlet temperature | ° C. | −11.5 | | −15.1 | −15.5 | −15.8 | −16.1 | −16.3 | −16.5 | −16.7 | −16.7 |
| Evaporator dewpoint | ° C. | −18.5 | | −14.9 | −14.5 | −14.2 | −13.9 | −13.7 | −13.5 | −13.3 | −13.3 |

TABLE 10-continued (Heating mode): Compositions comprising 4 weight % R-1132a

| Results | | R1234yf | R1132a<br>R32<br>R1234yf | 4%<br>8%<br>88% | 4%<br>10%<br>86% | 4%<br>12%<br>84% | 4%<br>14%<br>82% | 4%<br>16%<br>80% | 4%<br>18%<br>78% | 4%<br>20%<br>76% | 4%<br>21%<br>75% |
|---|---|---|---|---|---|---|---|---|---|---|---|
| Evaporator exit gas temperature | °C. | −17.5 | | −13.9 | −13.5 | −13.2 | −12.9 | −12.7 | −12.5 | −12.3 | −12.3 |
| Evaporator glide (out-in) | K | −7.1 | | 0.3 | 1.0 | 1.7 | 2.2 | 2.7 | 3.0 | 3.3 | 3.4 |
| Compressor suction pressure | bar | 1.30 | | 2.11 | 2.23 | 2.35 | 2.48 | 2.59 | 2.71 | 2.82 | 2.88 |
| Compressor discharge pressure | bar | 14.8 | | 20.0 | 20.8 | 21.5 | 22.2 | 22.8 | 23.5 | 24.1 | 24.4 |
| Condenser dew point | °C. | 55.4 | | 59.1 | 59.2 | 59.3 | 59.2 | 59.2 | 59.1 | 58.9 | 58.9 |
| Condenser bubble point | °C. | 54.6 | | 50.9 | 50.8 | 50.7 | 50.8 | 50.8 | 50.9 | 51.1 | 51.1 |
| Condenser exit liquid temperature | °C. | 51.6 | | 47.9 | 47.8 | 47.7 | 47.8 | 47.8 | 47.9 | 48.1 | 48.1 |
| Condenser glide (in-out) | K | 0.9 | | 8.3 | 8.5 | 8.5 | 8.5 | 8.3 | 8.1 | 7.9 | 7.7 |

TABLE 11

(Heating mode): Compositions comprising 5 weight % R-1132a

| Results | | R1234yf | R1132a<br>R32<br>R1234yf | 5%<br>8%<br>87% | 5%<br>10%<br>85% | 5%<br>12%<br>83% | 5%<br>14%<br>81% | 5%<br>16%<br>79% | 5%<br>18%<br>77% | 5%<br>20%<br>75% | 5%<br>21%<br>74% |
|---|---|---|---|---|---|---|---|---|---|---|---|
| Cooling COP | | 1.11 | | 1.26 | 1.27 | 1.28 | 1.29 | 1.29 | 1.30 | 1.31 | 1.31 |
| Cooling COP relative to Reference | | 100.0% | | 113.2% | 114.3% | 115.3% | 116.0% | 116.2% | 117.3% | 117.9% | 118.2% |
| Volumetric cooling capacity | kJ/m3 | 560 | | 977 | 1036 | 1095 | 1150 | 1195 | 1258 | 1310 | 1337 |
| Cooling Capacity relative to Reference | | 100.0% | | 174.5% | 185.2% | 195.6% | 205.4% | 213.6% | 224.8% | 234.1% | 238.8% |
| Heating COP | | 2.11 | | 2.26 | 2.27 | 2.28 | 2.29 | 2.29 | 2.30 | 2.31 | 2.31 |
| Volumetric heating Capacity | kJ/m3 | 1129 | | 1850 | 1952 | 2053 | 2148 | 2231 | 2336 | 2427 | 2472 |
| Heating Capacity relative to Reference | | 100.0% | | 163.8% | 172.9% | 181.8% | 190.2% | 197.5% | 206.8% | 214.9% | 218.8% |
| Cooling capacity | kW | 2.48 | | 2.65 | 2.66 | 2.67 | 2.69 | 2.68 | 2.70 | 2.71 | 2.71 |
| Heating capacity | kW | 5.00 | | 5.01 | 5.01 | 5.00 | 5.02 | 4.99 | 5.02 | 5.02 | 5.00 |
| Refrigeration effect | kJ/kg | 79.7 | | 94.6 | 96.7 | 98.8 | 100.8 | 102.7 | 104.7 | 106.6 | 107.6 |
| Pressure ratio | | 11.38 | | 9.44 | 9.25 | 9.07 | 8.92 | 8.84 | 8.64 | 8.51 | 8.45 |
| Compressor discharge temperature | °C. | 86.9 | | 96.5 | 98.1 | 99.6 | 101.2 | 102.9 | 104.1 | 105.6 | 106.3 |
| Discharge temp. difference from reference | K | 0.0 | | 9.5 | 11.1 | 12.7 | 14.2 | 16.0 | 17.2 | 18.6 | 19.3 |
| Evaporator inlet pressure | bar | 2.10 | | 2.61 | 2.70 | 2.80 | 2.90 | 3.01 | 3.09 | 3.19 | 3.24 |
| Condenser inlet pressure | bar | 14.80 | | 20.46 | 21.21 | 21.93 | 22.62 | 23.30 | 23.93 | 24.56 | 24.86 |
| Evaporator inlet temperature | °C. | −11.5 | | −15.4 | −15.7 | −16.0 | −16.3 | −16.4 | −16.7 | −16.8 | −16.8 |
| Evaporator dewpoint | °C. | −18.5 | | −14.6 | −14.3 | −14.0 | −13.7 | −13.6 | −13.3 | −13.2 | −13.2 |
| Evaporator exit gas temperature | °C. | −17.5 | | −13.6 | −13.3 | −13.0 | −12.7 | −12.6 | −12.3 | −12.2 | −12.2 |
| Evaporator glide (out-in) | K | −7.1 | | 0.7 | 1.5 | 2.1 | 2.6 | 2.8 | 3.3 | 3.6 | 3.7 |
| Compressor suction pressure | bar | 1.30 | | 2.17 | 2.29 | 2.42 | 2.54 | 2.64 | 2.77 | 2.89 | 2.94 |
| Compressor discharge pressure | bar | 14.8 | | 20.5 | 21.2 | 21.9 | 22.6 | 23.3 | 23.9 | 24.6 | 24.9 |
| Condenser dew point | °C. | 55.4 | | 59.4 | 59.5 | 59.5 | 59.4 | 59.3 | 59.2 | 59.1 | 59.0 |
| Condenser bubble point | °C. | 54.6 | | 50.6 | 50.5 | 50.5 | 50.6 | 50.7 | 50.8 | 50.9 | 51.0 |

TABLE 11-continued (Heating mode): Compositions comprising 5 weight % R-1132a

| Results | | R1234yf | R1132a<br>R32<br>R1234yf | 5%<br>8%<br>87% | 5%<br>10%<br>85% | 5%<br>12%<br>83% | 5%<br>14%<br>81% | 5%<br>16%<br>79% | 5%<br>18%<br>77% | 5%<br>20%<br>75% | 5%<br>21%<br>74% |
|---|---|---|---|---|---|---|---|---|---|---|---|
| Condenser exit liquid temperature | ° C. | 51.6 | | 47.6 | 47.5 | 47.5 | 47.6 | 47.7 | 47.8 | 47.9 | 48.0 |
| Condenser glide (in-out) | K | 0.9 | | 8.8 | 8.9 | 8.9 | 8.8 | 8.7 | 8.4 | 8.2 | 8.0 |

TABLE 12

(Heating mode): Compositions comprising 6 weight % R-1132a

| Results | | R1234yf | R1132a<br>R32<br>R1234yf | 6%<br>8%<br>86% | 6%<br>10%<br>84% | 6%<br>12%<br>82% | 6%<br>14%<br>80% | 6%<br>16%<br>78% | 6%<br>18%<br>76% | 6%<br>20%<br>74% | 6%<br>21%<br>73% |
|---|---|---|---|---|---|---|---|---|---|---|---|
| Cooling COP | | 1.11 | | 1.26 | 1.27 | 1.28 | 1.28 | 1.29 | 1.30 | 1.31 | 1.31 |
| Cooling COP relative to Reference | | 100.0% | | 113.2% | 114.2% | 115.1% | 115.1% | 115.8% | 117.1% | 117.6% | 117.8% |
| Volumetric cooling capacity | kJ/m3 | 560 | | 1002 | 1062 | 1119 | 1119 | 1175 | 1283 | 1335 | 1361 |
| Cooling Capacity relative to Reference | | 100.0% | | 179.1% | 189.7% | 199.9% | 199.9% | 210.0% | 229.3% | 238.6% | 243.1% |
| Heating COP | | 2.11 | | 2.26 | 2.27 | 2.28 | 2.28 | 2.29 | 2.30 | 2.31 | 2.31 |
| Volumetric heating Capacity | kJ/m3 | 1129 | | 1898 | 2000 | 2100 | 2100 | 2197 | 2385 | 2475 | 2520 |
| Heating Capacity relative to Reference | | 100.0% | | 168.0% | 177.1% | 185.9% | 185.9% | 194.6% | 211.2% | 219.2% | 223.1% |
| Cooling capacity | kW | 2.48 | | 2.64 | 2.65 | 2.67 | 2.66 | 2.67 | 2.69 | 2.70 | 2.70 |
| Heating capacity | kW | 5.00 | | 5.00 | 5.00 | 5.00 | 5.00 | 5.00 | 5.00 | 5.00 | 5.00 |
| Refrigeration effect | kJ/kg | 79.7 | | 95.0 | 97.1 | 99.1 | 99.1 | 101.1 | 104.9 | 106.8 | 107.7 |
| Pressure ratio | | 11.38 | | 9.38 | 9.19 | 9.03 | 9.03 | 8.87 | 8.59 | 8.47 | 8.42 |
| Compressor discharge temperature | ° C. | 86.9 | | 97.1 | 98.7 | 100.3 | 100.3 | 101.8 | 104.7 | 106.1 | 106.9 |
| Discharge temp. difference from reference | K | 0.0 | | 10.1 | 11.7 | 13.3 | 13.3 | 14.8 | 17.8 | 19.2 | 19.9 |
| Evaporator inlet pressure | bar | 2.10 | | 2.66 | 2.75 | 2.85 | 2.85 | 2.95 | 3.15 | 3.25 | 3.30 |
| Condenser inlet pressure | bar | 14.80 | | 20.91 | 21.67 | 22.39 | 22.39 | 23.08 | 24.40 | 25.03 | 25.33 |
| Evaporator inlet temperature | ° C. | −11.5 | | −15.6 | −15.9 | −16.2 | −16.2 | −16.5 | −16.8 | −16.9 | −17.0 |
| Evaporator dewpoint | ° C. | −18.5 | | −14.4 | −14.1 | −13.8 | −13.8 | −13.5 | −13.2 | −13.1 | −13.0 |
| Evaporator exit gas temperature | ° C. | −17.5 | | −13.4 | −13.1 | −12.8 | −12.8 | −12.5 | −12.2 | −12.1 | −12.0 |
| Evaporator glide (out-in) | K | −7.1 | | 1.2 | 1.9 | 2.4 | 2.4 | 2.9 | 3.6 | 3.9 | 4.0 |
| Compressor suction pressure | bar | 1.30 | | 2.23 | 2.36 | 2.48 | 2.48 | 2.60 | 2.84 | 2.95 | 3.01 |
| Compressor discharge pressure | bar | 14.8 | | 20.9 | 21.7 | 22.4 | 22.4 | 23.1 | 24.4 | 25.0 | 25.3 |
| Condenser dew point | ° C. | 55.4 | | 59.6 | 59.7 | 59.7 | 59.7 | 59.6 | 59.4 | 59.2 | 59.1 |
| Condenser bubble point | ° C. | 54.6 | | 50.4 | 50.3 | 50.3 | 50.3 | 50.4 | 50.6 | 50.8 | 50.9 |
| Condenser exit liquid temperature | ° C. | 51.6 | | 47.4 | 47.3 | 47.3 | 47.3 | 47.4 | 47.6 | 47.8 | 47.9 |
| Condenser glide (in-out) | K | 0.9 | | 9.2 | 9.3 | 9.3 | 9.3 | 9.2 | 8.7 | 8.4 | 8.3 |

TABLE 13

(Heating mode): Compositions comprising 7 weight % R-1132a

| Results | | R1234yf | R1132a<br>R32<br>R1234yf | 7%<br>8%<br>85% | 7%<br>10%<br>83% | 7%<br>12%<br>81% | 7%<br>14%<br>79% | 7%<br>16%<br>77% | 7%<br>18%<br>75% | 7%<br>20%<br>73% | 7%<br>21%<br>72% |
|---|---|---|---|---|---|---|---|---|---|---|---|
| Cooling COP | | 1.11 | | 1.26 | 1.27 | 1.28 | 1.28 | 1.29 | 1.30 | 1.30 | 1.30 |
| Cooling COP relative to Reference | | 100.0% | | 113.2% | 114.1% | 114.9% | 115.6% | 116.2% | 116.7% | 117.2% | 117.4% |
| Volumetric cooling capacity | kJ/m3 | 560 | | 1028 | 1087 | 1144 | 1200 | 1254 | 1307 | 1359 | 1385 |
| Cooling Capacity relative to Reference | | 100.0% | | 183.6% | 194.1% | 204.4% | 214.3% | 224.1% | 233.6% | 242.8% | 247.4% |
| Heating COP | | 2.11 | | 2.26 | 2.27 | 2.28 | 2.28 | 2.29 | 2.30 | 2.30 | 2.30 |
| Volumetric heating Capacity | kJ/m3 | 1129 | | 1945 | 2048 | 2147 | 2245 | 2340 | 2432 | 2523 | 2567 |
| Heating Capacity relative to Reference | | 100.0% | | 172.2% | 181.3% | 190.1% | 198.8% | 207.2% | 215.4% | 223.4% | 227.3% |
| Cooling capacity | kW | 2.48 | | 2.64 | 2.65 | 2.66 | 2.67 | 2.68 | 2.69 | 2.69 | 2.70 |
| Heating capacity | kW | 5.00 | | 5.00 | 5.00 | 5.00 | 5.00 | 5.00 | 5.00 | 5.00 | 5.00 |
| Refrigeration effect | kJ/kg | 79.7 | | 95.4 | 97.4 | 99.4 | 101.3 | 103.2 | 105.0 | 106.9 | 107.8 |
| Pressure ratio | | 11.38 | | 9.32 | 9.14 | 8.98 | 8.83 | 8.69 | 8.56 | 8.44 | 8.39 |
| Compressor discharge temperature | °C. | 86.9 | | 97.7 | 99.3 | 100.9 | 102.4 | 103.9 | 105.3 | 106.7 | 107.4 |
| Discharge temp. difference from reference | K | 0.0 | | 10.8 | 12.4 | 13.9 | 15.4 | 16.9 | 18.4 | 19.8 | 20.5 |
| Evaporator inlet pressure | bar | 2.10 | | 2.71 | 2.81 | 2.91 | 3.01 | 3.11 | 3.21 | 3.31 | 3.36 |
| Condenser inlet pressure | bar | 14.80 | | 21.37 | 22.12 | 22.85 | 23.54 | 24.22 | 24.87 | 25.49 | 25.80 |
| Evaporator inlet temperature | °C. | −11.5 | | −15.8 | −16.1 | −16.4 | −16.6 | −16.8 | −17.0 | −17.1 | −17.1 |
| Evaporator dewpoint | °C. | −18.5 | | −14.2 | −13.9 | −13.6 | −13.4 | −13.2 | −13.0 | −12.9 | −12.9 |
| Evaporator exit gas temperature | °C. | −17.5 | | −13.2 | −12.9 | −12.6 | −12.4 | −12.2 | −12.0 | −11.9 | −11.9 |
| Evaporator glide (out-in) | K | −7.1 | | 1.6 | 2.2 | 2.8 | 3.3 | 3.6 | 3.9 | 4.1 | 4.2 |
| Compressor suction pressure | bar | 1.30 | | 2.29 | 2.42 | 2.54 | 2.67 | 2.79 | 2.91 | 3.02 | 3.08 |
| Compressor discharge pressure | bar | 14.8 | | 21.4 | 22.1 | 22.8 | 23.5 | 24.2 | 24.9 | 25.5 | 25.8 |
| Condenser dew point | °C. | 55.4 | | 59.8 | 59.9 | 59.8 | 59.7 | 59.6 | 59.5 | 59.3 | 59.3 |
| Condenser bubble point | °C. | 54.6 | | 50.2 | 50.1 | 50.2 | 50.3 | 50.4 | 50.5 | 50.7 | 50.7 |
| Condenser exit liquid temperature | °C. | 51.6 | | 47.2 | 47.1 | 47.2 | 47.3 | 47.4 | 47.5 | 47.7 | 47.7 |
| Condenser glide (in-out) | K | 0.9 | | 9.7 | 9.7 | 9.6 | 9.5 | 9.3 | 9.0 | 8.7 | 8.5 |

TABLE 14

(Heating mode): Compositions comprising 8 weight % R-1132a

| Results | | R1234yf | R1132a<br>R32<br>R1234yf | 8%<br>8%<br>84% | 8%<br>10%<br>82% | 8%<br>12%<br>80% | 8%<br>14%<br>78% | 8%<br>16%<br>76% | 8%<br>18%<br>74% | 8%<br>20%<br>72% | 8%<br>21%<br>71% |
|---|---|---|---|---|---|---|---|---|---|---|---|
| Cooling COP | | 1.11 | | 1.26 | 1.27 | 1.27 | 1.28 | 1.29 | 1.29 | 1.30 | 1.30 |
| Cooling COP relative to Reference | | 100.0% | | 113.1% | 114.0% | 114.7% | 115.3% | 115.9% | 116.3% | 116.8% | 117.0% |
| Volumetric cooling capacity | kJ/m3 | 560 | | 1053 | 1111 | 1168 | 1224 | 1278 | 1331 | 1383 | 1408 |
| Cooling Capacity relative to Reference | | 100.0% | | 188.1% | 198.6% | 208.7% | 218.7% | 228.4% | 237.8% | 247.1% | 251.6% |
| Heating COP | | 2.11 | | 2.26 | 2.27 | 2.27 | 2.28 | 2.29 | 2.29 | 2.30 | 2.30 |
| Volumetric heating Capacity | kJ/m3 | 1129 | | 1993 | 2095 | 2195 | 2292 | 2387 | 2480 | 2571 | 2615 |

TABLE 14-continued (Heating mode): Compositions comprising 8 weight % R-1132a

| Results | | R1234yf | R1132a<br>R32<br>R1234yf | 8%<br>8%<br>84% | 8%<br>10%<br>82% | 8%<br>12%<br>80% | 8%<br>14%<br>78% | 8%<br>16%<br>76% | 8%<br>18%<br>74% | 8%<br>20%<br>72% | 8%<br>21%<br>71% |
|---|---|---|---|---|---|---|---|---|---|---|---|
| Heating Capacity relative to Reference | | 100.0% | | 176.4% | 185.5% | 194.3% | 203.0% | 211.4% | 219.6% | 227.6% | 231.6% |
| Cooling capacity | kW | 2.48 | | 2.64 | 2.65 | 2.66 | 2.67 | 2.68 | 2.68 | 2.69 | 2.69 |
| Heating capacity | kW | 5.00 | | 5.00 | 5.00 | 5.00 | 5.00 | 5.00 | 5.00 | 5.00 | 5.00 |
| Refrigeration effect | kJ/kg | 79.7 | | 95.7 | 97.7 | 99.6 | 101.5 | 103.3 | 105.2 | 107.0 | 107.9 |
| Pressure ratio | | 11.38 | | 9.27 | 9.09 | 8.93 | 8.78 | 8.65 | 8.52 | 8.41 | 8.36 |
| Compressor discharge temperature | °C. | 86.9 | | 98.3 | 99.9 | 101.5 | 103.0 | 104.4 | 105.9 | 107.3 | 108.0 |
| Discharge temp. difference from reference | K | 0.0 | | 11.4 | 13.0 | 14.5 | 16.0 | 17.5 | 18.9 | 20.4 | 21.1 |
| Evaporator inlet pressure | bar | 2.10 | | 2.76 | 2.86 | 2.96 | 3.07 | 3.17 | 3.27 | 3.37 | 3.42 |
| Condenser inlet pressure | bar | 14.80 | | 21.83 | 22.58 | 23.31 | 24.01 | 24.68 | 25.34 | 25.97 | 26.27 |
| Evaporator inlet temperature | °C. | −11.5 | | −16.0 | −16.3 | −16.6 | −16.8 | −17.0 | −17.1 | −17.2 | −17.2 |
| Evaporator dewpoint | °C. | −18.5 | | −14.0 | −13.7 | −13.4 | −13.2 | −13.0 | −12.9 | −12.8 | −12.8 |
| Evaporator exit gas temperature | °C. | −17.5 | | −13.0 | −12.7 | −12.4 | −12.2 | −12.0 | −11.9 | −11.8 | −11.8 |
| Evaporator glide (out-in) | K | −7.1 | | 2.0 | 2.6 | 3.1 | 3.6 | 3.9 | 4.2 | 4.4 | 4.5 |
| Compressor suction pressure | bar | 1.30 | | 2.36 | 2.48 | 2.61 | 2.73 | 2.85 | 2.97 | 3.09 | 3.14 |
| Compressor discharge pressure | bar | 14.8 | | 21.8 | 22.6 | 23.3 | 24.0 | 24.7 | 25.3 | 26.0 | 26.3 |
| Condenser dew point | °C. | 55.4 | | 60.0 | 60.0 | 60.0 | 59.9 | 59.8 | 59.6 | 59.4 | 59.4 |
| Condenser bubble point | °C. | 54.6 | | 50.0 | 50.0 | 50.0 | 50.1 | 50.2 | 50.4 | 50.6 | 50.6 |
| Condenser exit liquid temperature | °C. | 51.6 | | 47.0 | 47.0 | 47.0 | 47.1 | 47.2 | 47.4 | 47.6 | 47.6 |
| Condenser glide (in-out) | K | 0.9 | | 10.1 | 10.1 | 10.0 | 9.8 | 9.5 | 9.2 | 8.9 | 8.7 |

TABLE 15

(Heating mode): Compositions comprising 9 weight % R-1132a

| Results | | R1234yf | R1132a<br>R32<br>R1234yf | 9%<br>8%<br>83% | 9%<br>10%<br>81% | 9%<br>12%<br>79% | 9%<br>14%<br>77% | 9%<br>16%<br>75% | 9%<br>18%<br>73% | 9%<br>20%<br>71% | 9%<br>21%<br>70% |
|---|---|---|---|---|---|---|---|---|---|---|---|
| Cooling COP | | 1.11 | | 1.25 | 1.26 | 1.27 | 1.28 | 1.28 | 1.29 | 1.29 | 1.29 |
| Cooling COP relative to Reference | | 100.0% | | 113.0% | 113.8% | 114.4% | 115.0% | 115.5% | 115.9% | 116.4% | 116.5% |
| Volumetric cooling capacity | kJ/m3 | 560 | | 1077 | 1136 | 1193 | 1248 | 1302 | 1355 | 1406 | 1432 |
| Cooling Capacity relative to Reference | | 100.0% | | 192.5% | 202.9% | 213.1% | 223.0% | 232.6% | 242.1% | 251.3% | 255.8% |
| Heating COP | | 2.11 | | 2.25 | 2.26 | 2.27 | 2.28 | 2.28 | 2.29 | 2.29 | 2.29 |
| Volumetric heating Capacity | kJ/m3 | 1129 | | 2040 | 2142 | 2242 | 2340 | 2435 | 2528 | 2619 | 2663 |
| Heating Capacity relative to Reference | | 100.0% | | 180.6% | 189.7% | 198.5% | 207.2% | 215.6% | 223.8% | 231.9% | 235.8% |
| Cooling capacity | kW | 2.48 | | 2.64 | 2.65 | 2.66 | 2.67 | 2.67 | 2.68 | 2.69 | 2.69 |
| Heating capacity | kW | 5.00 | | 5.00 | 5.00 | 5.00 | 5.00 | 5.00 | 5.00 | 5.00 | 5.00 |
| Refrigeration effect | kJ/kg | 79.7 | | 96.0 | 98.0 | 99.9 | 101.7 | 103.5 | 105.3 | 107.1 | 107.9 |
| Pressure ratio | | 11.38 | | 9.21 | 9.04 | 8.89 | 8.74 | 8.61 | 8.49 | 8.38 | 8.32 |
| Compressor discharge temperature | °C. | 86.9 | | 99.0 | 100.5 | 102.1 | 103.6 | 105.0 | 106.5 | 107.9 | 108.6 |

TABLE 15-continued (Heating mode): Compositions comprising 9 weight % R-1132a

| Results | | R1234yf | R1132a R32 R1234yf | 9% 8% 83% | 9% 10% 81% | 9% 12% 79% | 9% 14% 77% | 9% 16% 75% | 9% 18% 73% | 9% 20% 71% | 9% 21% 70% |
|---|---|---|---|---|---|---|---|---|---|---|---|
| Discharge temp. difference from reference | K | 0.0 | | 12.0 | 13.6 | 15.1 | 16.6 | 18.1 | 19.5 | 20.9 | 21.6 |
| Evaporator inlet pressure | bar | 2.10 | | 2.81 | 2.91 | 3.02 | 3.13 | 3.23 | 3.33 | 3.44 | 3.49 |
| Condenser inlet pressure | bar | 14.80 | | 22.29 | 23.04 | 23.77 | 24.47 | 25.15 | 25.81 | 26.44 | 26.75 |
| Evaporator inlet temperature | °C. | −11.5 | | −16.2 | −16.5 | −16.7 | −17.0 | −17.1 | −17.2 | −17.3 | −17.4 |
| Evaporator dewpoint | °C. | −18.5 | | −13.8 | −13.5 | −13.3 | −13.1 | −12.9 | −12.8 | −12.7 | −12.6 |
| Evaporator exit gas temperature | °C. | −17.5 | | −12.8 | −12.5 | −12.3 | −12.1 | −11.9 | −11.8 | −11.7 | −11.6 |
| Evaporator glide (out-in) | K | −7.1 | | 2.4 | 3.0 | 3.5 | 3.9 | 4.2 | 4.5 | 4.7 | 4.7 |
| Compressor suction pressure | bar | 1.30 | | 2.42 | 2.55 | 2.67 | 2.80 | 2.92 | 3.04 | 3.16 | 3.21 |
| Compressor discharge pressure | bar | 14.8 | | 22.3 | 23.0 | 23.8 | 24.5 | 25.2 | 25.8 | 26.4 | 26.7 |
| Condenser dew point | °C. | 55.4 | | 60.2 | 60.2 | 60.1 | 60.0 | 59.9 | 59.7 | 59.5 | 59.4 |
| Condenser bubble point | °C. | 54.6 | | 49.8 | 49.8 | 49.9 | 50.0 | 50.1 | 50.3 | 50.5 | 50.6 |
| Condenser exit liquid temperature | °C. | 51.6 | | 46.8 | 46.8 | 46.9 | 47.0 | 47.1 | 47.3 | 47.5 | 47.6 |
| Condenser glide (in-out) | K | 0.9 | | 10.4 | 10.4 | 10.2 | 10.0 | 9.7 | 9.4 | 9.1 | 8.9 |

TABLE 16

(Heating mode): Compositions comprising 10 weight % R-1132a

| Results | | R1234yf | R1132a R32 R1234yf | 10% 8% 82% | 10% 10% 80% | 10% 12% 78% | 10% 14% 76% | 10% 16% 74% | 10% 18% 72% | 10% 20% 70% | 10% 21% 69% |
|---|---|---|---|---|---|---|---|---|---|---|---|
| Cooling COP | | 1.11 | | 1.25 | 1.26 | 1.27 | 1.27 | 1.28 | 1.28 | 1.29 | 1.29 |
| Cooling COP relative to Reference | | 100.0% | | 112.8% | 113.5% | 114.1% | 114.7% | 115.1% | 115.5% | 115.9% | 116.1% |
| Volumetric cooling capacity | kJ/m3 | 560 | | 1102 | 1160 | 1217 | 1272 | 1326 | 1378 | 1430 | 1455 |
| Cooling Capacity relative to Reference | | 100.0% | | 196.9% | 207.3% | 217.4% | 227.2% | 236.9% | 246.3% | 255.5% | 260.0% |
| Heating COP | | 2.11 | | 2.25 | 2.26 | 2.27 | 2.27 | 2.28 | 2.28 | 2.29 | 2.29 |
| Volumetric heating Capacity | kJ/m3 | 1129 | | 2088 | 2190 | 2290 | 2387 | 2483 | 2576 | 2667 | 2711 |
| Heating Capacity relative to Reference | | 100.0% | | 184.8% | 193.9% | 202.7% | 211.4% | 219.8% | 228.1% | 236.1% | 240.1% |
| Cooling capacity | kW | 2.48 | | 2.64 | 2.65 | 2.66 | 2.66 | 2.67 | 2.68 | 2.68 | 2.68 |
| Heating capacity | kW | 5.00 | | 5.00 | 5.00 | 5.00 | 5.00 | 5.00 | 5.00 | 5.00 | 5.00 |
| Refrigeration effect | kJ/kg | 79.7 | | 96.3 | 98.2 | 100.0 | 101.8 | 103.6 | 105.3 | 107.1 | 108.0 |
| Pressure ratio | | 11.38 | | 9.16 | 9.00 | 8.84 | 8.70 | 8.57 | 8.45 | 8.34 | 8.29 |
| Compressor discharge temperature | °C. | 86.9 | | 99.6 | 101.1 | 102.7 | 104.1 | 105.6 | 107.0 | 108.4 | 109.1 |
| Discharge temp. difference from reference | K | 0.0 | | 12.6 | 14.2 | 15.7 | 17.2 | 18.6 | 20.1 | 21.5 | 22.2 |
| Evaporator inlet pressure | bar | 2.10 | | 2.86 | 2.97 | 3.08 | 3.18 | 3.29 | 3.40 | 3.50 | 3.55 |
| Condenser inlet pressure | bar | 14.80 | | 22.75 | 23.51 | 24.24 | 24.94 | 25.62 | 26.28 | 26.92 | 27.23 |
| Evaporator inlet temperature | °C. | −11.5 | | −16.4 | −16.7 | −16.9 | −17.1 | −17.3 | −17.4 | −17.4 | −17.5 |
| Evaporator dewpoint | °C. | −18.5 | | −13.6 | −13.3 | −13.1 | −12.9 | −12.7 | −12.6 | −12.6 | −12.5 |

TABLE 16-continued (Heating mode): Compositions comprising 10 weight % R-1132a

| Results | | R1234yf | R1132a<br>R32<br>R1234yf | 10%<br>8%<br>82% | 10%<br>10%<br>80% | 10%<br>12%<br>78% | 10%<br>14%<br>76% | 10%<br>16%<br>74% | 10%<br>18%<br>72% | 10%<br>20%<br>70% | 10%<br>21%<br>69% |
|---|---|---|---|---|---|---|---|---|---|---|---|
| Evaporator exit gas temperature | °C. | −17.5 | | −12.6 | −12.3 | −12.1 | −11.9 | −11.7 | −11.6 | −11.6 | −11.5 |
| Evaporator glide (out-in) | K | −7.1 | | 2.7 | 3.3 | 3.8 | 4.2 | 4.5 | 4.7 | 4.9 | 4.9 |
| Compressor suction pressure | bar | 1.30 | | 2.48 | 2.61 | 2.74 | 2.87 | 2.99 | 3.11 | 3.23 | 3.28 |
| Compressor discharge pressure | bar | 14.8 | | 22.7 | 23.5 | 24.2 | 24.9 | 25.6 | 26.3 | 26.9 | 27.2 |
| Condenser dew point | °C. | 55.4 | | 60.4 | 60.3 | 60.3 | 60.1 | 60.0 | 59.8 | 59.6 | 59.5 |
| Condenser bubble point | °C. | 54.6 | | 49.6 | 49.7 | 49.7 | 49.9 | 50.0 | 50.2 | 50.4 | 50.5 |
| Condenser exit liquid temperature | °C. | 51.6 | | 46.6 | 46.7 | 46.7 | 46.9 | 47.0 | 47.2 | 47.4 | 47.5 |
| Condenser glide (in-out) | K | 0.9 | | 10.8 | 10.7 | 10.5 | 10.3 | 10.0 | 9.6 | 9.2 | 9.1 |

The invention claimed is:

1. A composition comprising:
   (a) from about 6 to about 18 weight % R-1132a
   (b) from about 5 to about 35 weight % R-32
   (c) from about 47 to about 89 weight % R-1234yf.

2. The composition according to claim 1 comprising from about 6 to about 15 weight % R-1132a, from about 7 to about 12 weight % R-1132a, from about 7 to about 10 weight % R-1132a, from about 6 to about 10 weight % R-1132a, or from 6 to about 7 weight % R-1132a.

3. The composition according to claim 2, wherein the composition comprises from about 7 to about 28 weight % R-32, from about 10 to about 25 weight % R-32, from about 12 to about 23 weight % R-32, from about 14 to about 21 weight % R-32, or from about 15 to about 19 weight % R-32.

4. The composition according to claim 3, wherein the composition comprises from about 63 to about 85 weight % R-1234yf, from about 67 to about 83 weight % R-1234yf, from about 69 to about 82 weight % R-1234yf, or from about 72 to about 81 weight % R-1234yf.

5. The composition according to claim 1 comprising from about 6 to about 30 weight % R-32, such as from about 7 to about 20 weight % R-32, from about 8 to about 15 weight % R-32, or from about 9 to about 13 weight % R-32.

6. The composition according to claim 5, wherein the composition comprises from about 55 to about 87 weight % R-1234yf, from about 60 to about 84 weight % R-1234yf, or from about 75 to about 84 weight % R-1234yf.

7. The composition according to claim 6, wherein the composition comprises from about 6 to about 9 weight % R-1132a, or from about 6 to about 8 weight % R-1132a.

8. The composition according to claim 1 comprising from about 55 to about 88 weight % R-1234yf, from about 60 to about 87 weight % R-1234yf, from about 75 to about 85 weight % R-1234yf, or from about 78 to about 84 weight % R-1234yf.

9. The composition according to claim 8, wherein the composition comprises from about 6 to about 10 weight % R-1132a, or from 6 to about 7 weight % R-1132a.

10. The composition according to claim 9, wherein the composition comprises from about 6 to less than about 30 weight % R-32, or from about 7 to less than about 30 weight % R-32.

11. The composition according to claim 1, wherein the composition comprises about 8 weight % R-1132a, about 11 weight % R-32 and about 81 weight % R-1234yf.

12. The composition according to claim 1, wherein the composition comprises about 6 weight % R-1132a, about 20 weight % R-32 and about 74 weight % R-1234yf.

13. The composition according to claim 1, wherein the tolerances (preferably manufacturing tolerances) are about ±0.5 weight % for R-1132a, about ±1 weight % for R-32 and about ±1.5 weight % for R-1234yf.

14. The composition according to claim 1 consisting essentially of the stated components.

15. The composition according to claim 1, wherein the composition has:
   (a) a higher lower flammable limit; (b) a higher ignition energy (c) a higher auto-ignition temperature; and/or (d) a lower burning velocity compared to R-1132a alone.

16. The composition according to claim 1, wherein the composition has a burning velocity of less than about 10 cm/s as determined in accordance with ASHRAE Standard 34:2019.

17. The composition according to claim 1, wherein the composition is classified as weakly flammable ("class 2L") as determined in accordance with ASHRAE Standard 34:2019.

18. The composition according to claim 1, wherein the composition has a Global Warming Potential (GWP) of less than about 400.

19. The composition comprising a lubricant and a composition according to claim 1, wherein the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

20. The composition according to claim 1, wherein the composition has a temperature glide in an evaporator or condenser of less than about 12K.

21. The composition according to claim 1, wherein the composition can operate in a heat pump mode at a temperature of less than about 20° C.

22. The composition according to claim 1 having a heating capacity which is greater than or about equal to that of R-1234yf.

23. The composition according to claim 1 having a volumetric cooling capacity which is greater than or about equal to that of R-1234yf.

24. The composition according to claim 1 having a cycle efficiency (coefficient of performance (COP)) which is greater than or about equal to or higher than that of R-1234yf.

25. The composition according to claim 1, wherein the composition evaporates at a temperature of below about 30° C.

26. The composition according to claim 1, wherein the composition condenses at a temperature of above about 40° C.

27. The composition according to claim 1, wherein the compressor discharge temperature of the composition is within about 15K of the existing refrigerant fluid it is replacing.

28. A method of operating a heat pump system of a vehicle, comprising providing the composition according to claim 1 as a working fluid in the heat pump system.

29. A method of operating an air-conditioning system of a vehicle, wherein the vehicle comprises an electric vehicle or a vehicle operating on an internal combustion engine (ICE), comprising providing the composition according to claim 1 as a working fluid in the air-conditioning system.

30. A method of operating a refrigeration system or air-conditioning system, comprising replacing the existing heat transfer fluid with the composition according to claim 1.

31. A heat transfer device comprising a composition as defined in claim 1 preferably the heat transfer device is a refrigeration device or an air-conditioning device.

32. A method for cooling an article which comprises condensing a composition of claim 1 and thereafter evaporating said composition in the vicinity of the article to be cooled.

33. A method for heating an article which comprises condensing a composition according to claim 1 in the vicinity of the article to be heated and thereafter evaporating said composition.

* * * * *